(12) United States Patent
Di Leo et al.

(10) Patent No.: US 11,137,311 B2
(45) Date of Patent: Oct. 5, 2021

(54) PRESSURE SENSING DEVICES WITH IMPROVED FORCE THRESHOLD

(71) Applicant: Georgia Tech Research Corporation, Atlanta, GA (US)

(72) Inventors: Claudio V. Di Leo, Atlanta, GA (US); Mark F. Costello, Atlanta, GA (US); Benjamin Leon, Atlanta, GA (US); Julian Jose Rimoli, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 164 days.

(21) Appl. No.: 16/585,162

(22) Filed: Sep. 27, 2019

(65) Prior Publication Data
US 2020/0103301 A1   Apr. 2, 2020

Related U.S. Application Data

(60) Provisional application No. 62/737,428, filed on Sep. 27, 2018.

(51) Int. Cl.
*G01L 19/06* (2006.01)
(52) U.S. Cl.
CPC ................. *G01L 19/0618* (2013.01)
(58) Field of Classification Search
None
See application file for complete search history.

(56) References Cited

U.S. PATENT DOCUMENTS

| | | | | |
|---|---|---|---|---|
| 9,534,975 | B2* | 1/2017 | Kachenko | G01L 19/0627 |
| 10,082,437 | B2* | 9/2018 | Duplain | G01L 9/0079 |
| 2006/0192976 | A1* | 8/2006 | Hall | G01B 9/02051 |
| | | | | 356/505 |
| 2016/0033350 | A1* | 2/2016 | Stokes | G01L 19/0023 |
| | | | | 73/700 |
| 2016/0054192 | A1* | 2/2016 | Kachenko | G01L 19/04 |
| | | | | 73/715 |
| 2018/0148316 | A1* | 5/2018 | Duqi | B81B 3/0094 |

* cited by examiner

*Primary Examiner* — Brandi N Hopkins
*Assistant Examiner* — Nigel H Plumb
(74) *Attorney, Agent, or Firm* — Troutman Pepper Hamilton Sanders LLP; Ryan A. Schneider; Dustin B. Weeks

(57) ABSTRACT

A sensing device includes a pressure sensor and a deformable cover. A fluid cavity engineered between the deformable cover and the pressure sensor changes shape and ultimately collapses as force is applied to the sensing device. The shape and collapse of the engineered cavity, along with the entire structure of deformable cover and the pressure sensor, govern the force vs. pressure behavior of the sensing device and can be tailored as desired. A first benefit includes providing tailored properties of the sensing device by varying the structure of the deformable cover. A second benefit includes that if too much force is applied, excess force—beyond that which is required to collapse the engineered cavity—does not produce excess pressure which would cause damage to the pressure sensor. As such the sensing device is protected from accidental, or intended, over loading.

15 Claims, 21 Drawing Sheets

Figure 2
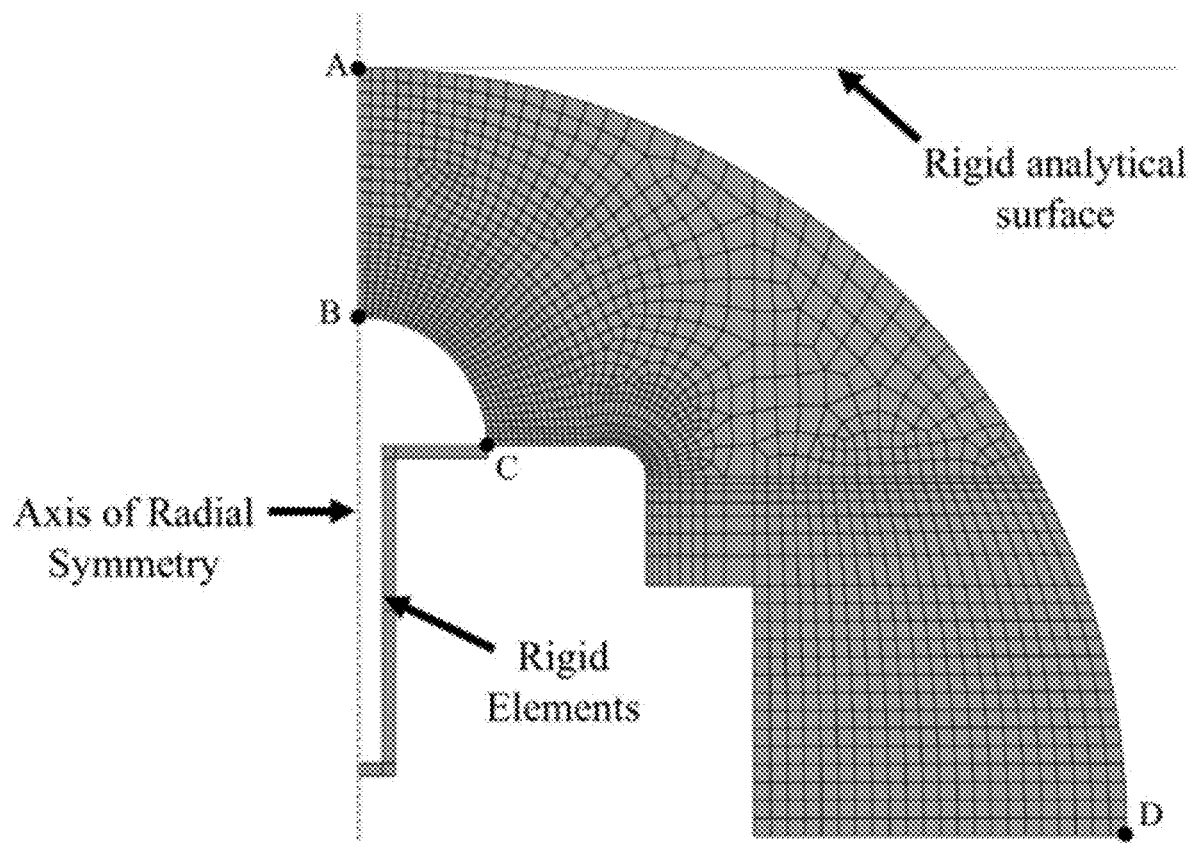
Figures 3a-c
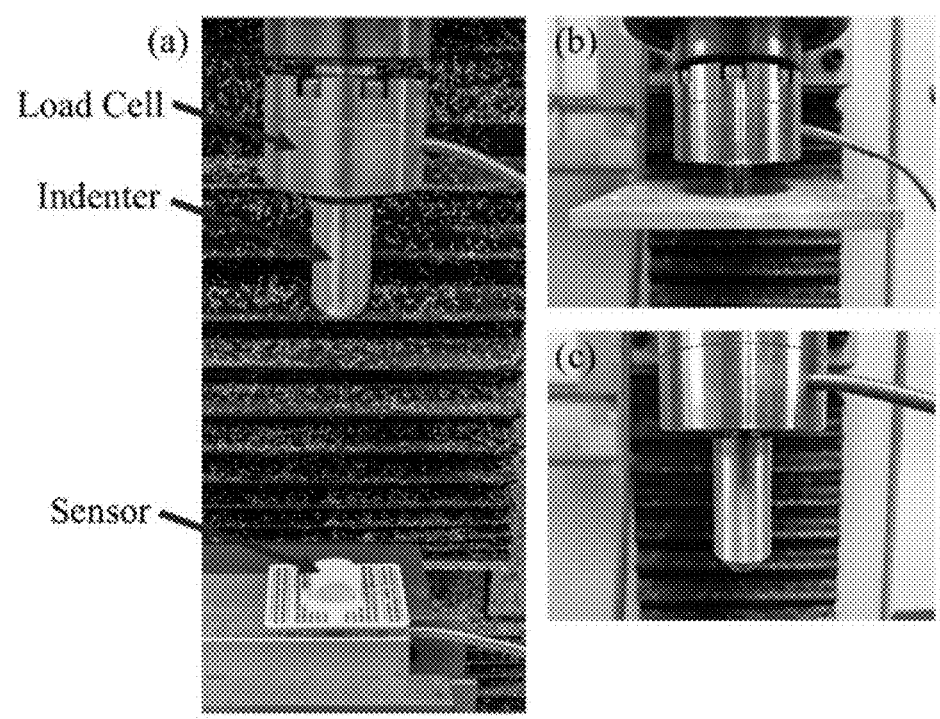

Figures 4a-b
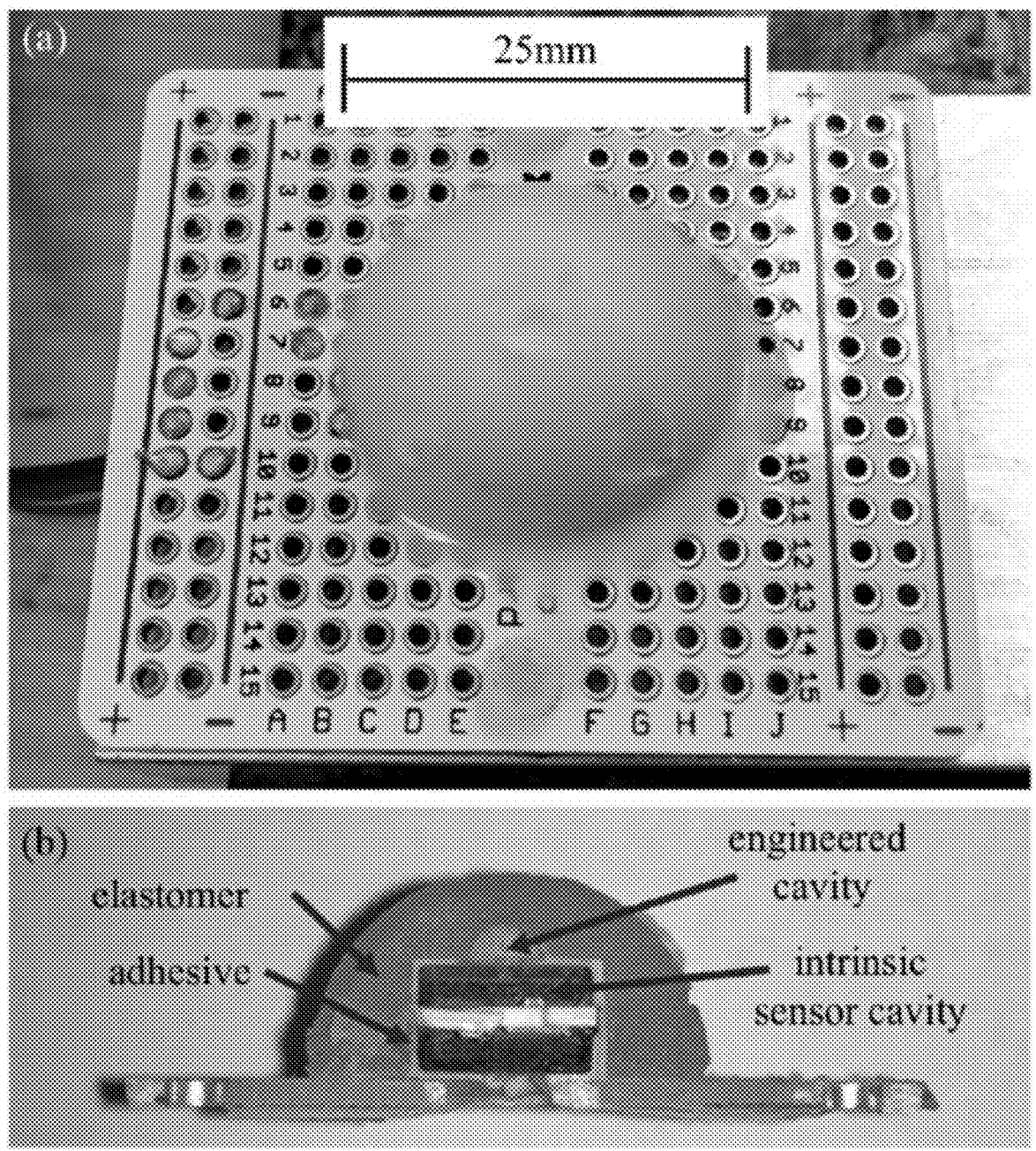

Figures 11a-c
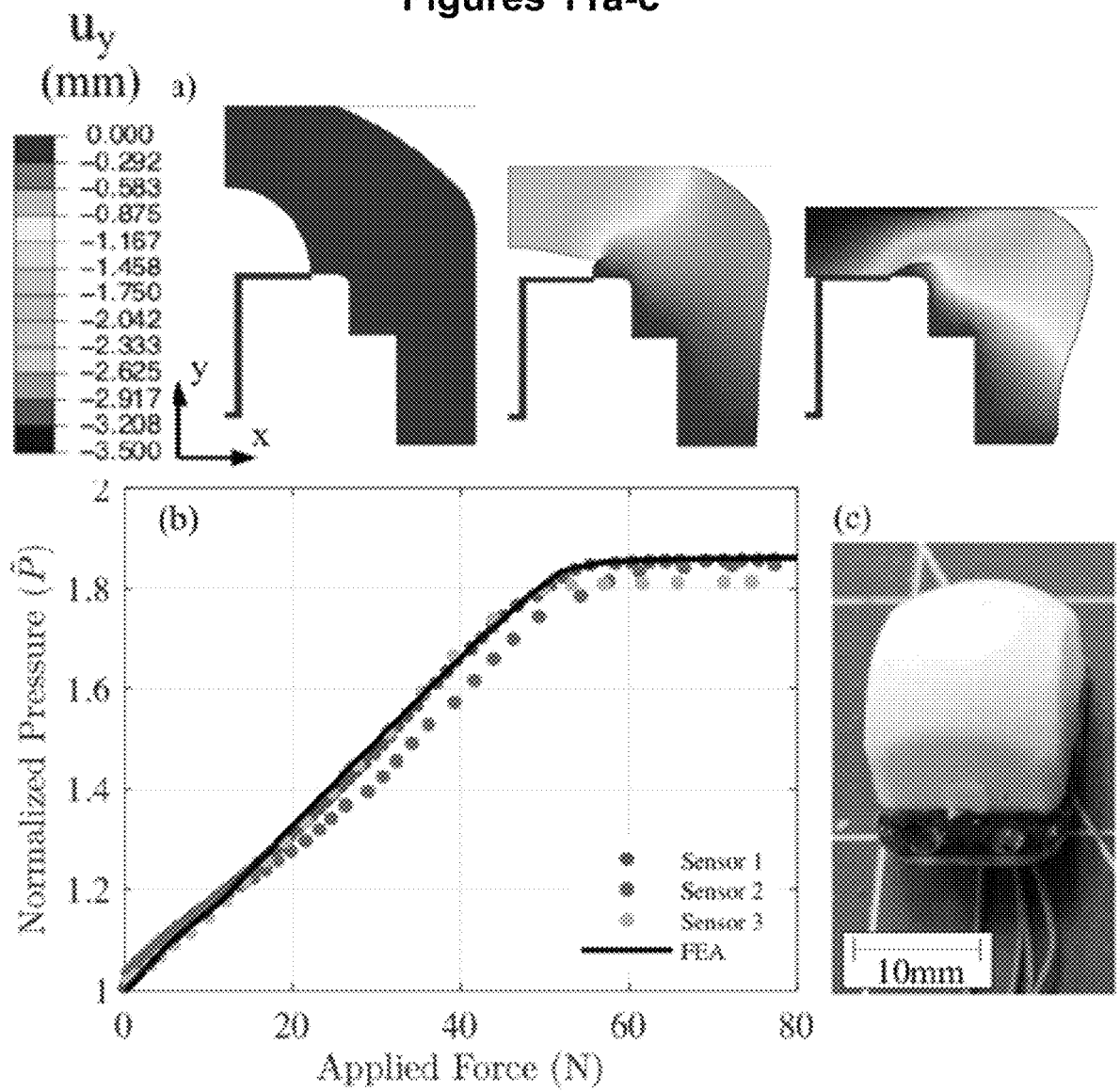

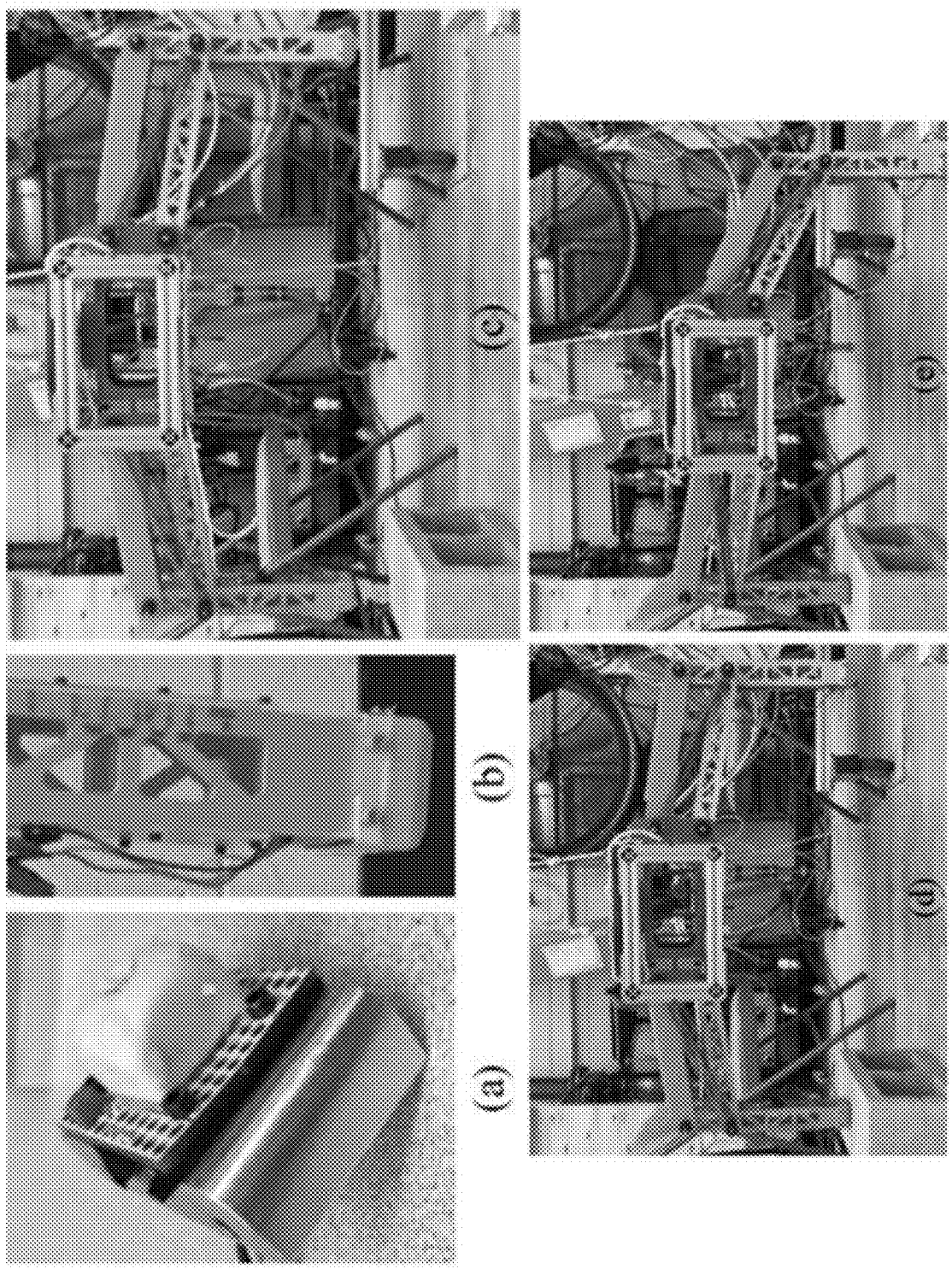
Figures 12a-e

Figures 14a-b
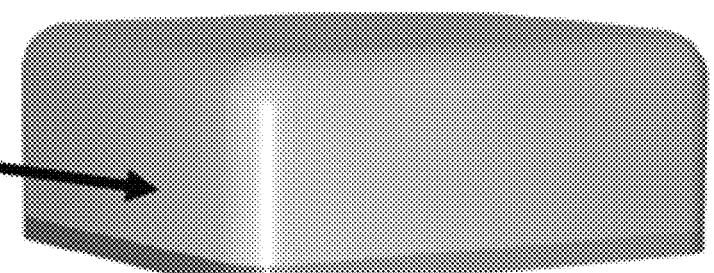
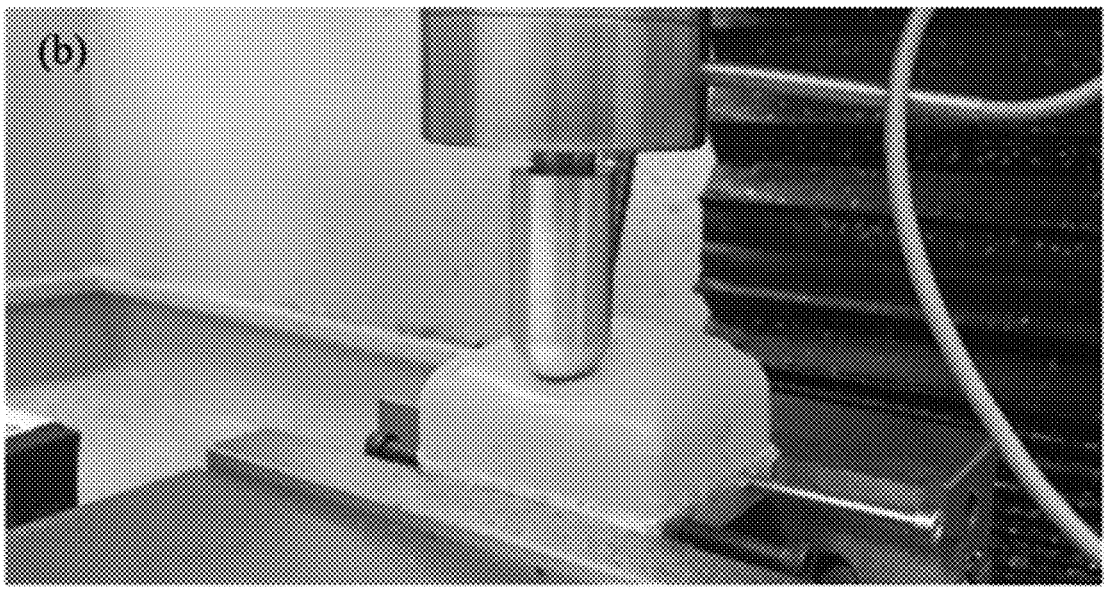

PRESSURE SENSING DEVICES WITH IMPROVED FORCE THRESHOLD

CROSS-REFERENCE TO RELATED APPLICATIONS

This application claims the benefit of U.S. Provisional Application Ser. No. 62/737,428, filed on Sep. 27, 2018, which is incorporated herein by reference in its entirety as if fully set forth below.

FEDERALLY SPONSORED RESEARCH STATEMENT

The invention described in this patent application was made with Government support under Agreement No. FA8650-12-C-7276, awarded by Air Force Office of Scientific Research. The Government has certain rights in the invention described in this patent application.

TECHNICAL FIELD OF THE INVENTION

The various embodiments of the present disclosure relate generally to sensors. More particularly, the various embodiments of the present invention are directed to pressure sensors.

BACKGROUND OF THE INVENTION

Force measurement sensors are of critical technical importance in the realization of articulated robots capable of navigating unknown or challenging terrains. In particular, haptic robotic systems often require contact measurements in the form of force magnitude, and sometimes direction, between an articulating extremity and a contact surface in order to generate controlled motion of the extremity. Force sensors on these systems take on a variety of form factors that can rely on optics, wave propagation through materials, capacitance, and strain. There is a strong need for improved novel force sensors, particularly in the development of a robotic landing gear (RLG) for rotorcraft.

RLG for rotorcraft require force measurements between the landing gear and the ground. On uneven terrain, the system uses this force data to maintain a level fuselage through actuation of the landing gear. Therefore, these sensors are crucial to successful landings on uneven terrain and carry a set of unique requirements. Ideally, sensors for RLG would be sensitive and accurate at low forces, on the order of $\leq 10$ N, so they are capable of accurately detecting contact on uneven or sharp terrains. Desirably, they are robust enough to survive hard landings with maximum loads on the order of thousands of newtons. Additionally, landing gear for rotorcraft require harsh environment durability, robustness, low complexity, and the ability to withstand unforeseen impacts on a regular basis. As a direct result, force sensors for RLG desirably have the same durability as the landing gear. Further review into relevant force sensor research provided four primary contenders for suitable RLG force sensors; resistive film sensors, load cells, elastomer encased magnets, and elastomer or elastomer composite encapsulated sensors.

Resistive film force sensors estimate force based on the change in resistance caused by deformation in the film. The first RLG flight prototype developed used sensors of this type installed at the tip of each robotic leg. The resistive film sensors were simple to implement and have the necessary sensor characteristics, but they lacked consistency and robustness. For example, the sensors required calibration prior to each flight because their resistive properties drifted significantly over time under the full weight of the rotorcraft. Additionally, they were unable to withstand sustained usage. The sensors would crack or tear after limited usage in an indoor experimental environment. Finally, these sensors offered no redundancy against failure. Once a film sustained damage all sensing capabilities where lost, and the affected leg was unable to conform to the surface. This made them impractical for further application.

Load cells are also potential candidates for contact force sensors and have been investigated in the literature. However, the use of load cells for ground contact sensing has some significant drawbacks. First, load cells rated to withstand the entire weight of an aircraft, in addition to any impact loads, do not have sufficient sensitivity at small loads. Second, load cells generally suffer from inertial effects where vibrations or dynamic motion of the load cell produce force readings which can be erroneously interpreted as actual contact. Additionally, load cells can add significant weight to a system when compared with the sensors developed in this work. Although some load cells have built-in accelerometers to compensate for this effect in the direction of loading, it is difficult to ensure that inertial loads will not lead to ground contact errors in a rotorcraft where vibrations occur at various magnitudes and directions. Finally, load cells specially designed for contact sensing scenarios carry a high cost, for example, on the order of hundreds of dollars per foot.

Another conventional sensor estimates contact force based on magnetic field changes. This sensor relies on the magnetic field changes caused by a magnet embedded in a deforming structure to estimate contact force and stick-slip interactions. Similarly, another conventional sensor uses magnets embedded in an elastomer along with a suitable magnetic field detector to measure changes in the deformation of the elastomer and subsequently estimate forces. This system enables the tailoring of sensor properties from elastomer material properties, magnet strength, and magnet placement. The mapping between force and measurement data is difficult to predict prior to sensor construction, therefore sensor performance relies on training data in order to be effective. However, a force sensor that relies on magnetic field changes does not have a straightforward design path for use on a rotorcraft. Specifically, a sensor which requires accurate measurement of a magnetic field on a rotorcraft with large mobile metal components as well as interactions with unprepared surfaces, including metallic surfaces such as ship decks, eliminated this sensor design from further consideration for this application. Furthermore, magnet-based sensors are susceptible to any electromagnetic interference that is present in rotorcraft operational scenarios. This form of interference skews and distorts measurements in an unpredictable manner, limiting the ability to accurately measure force.

In the category of designs making use of elastomeric materials for force sensing, various approaches have also been developed using engineered surfaces. For example, one design included a polydimethylsiloxane (PDMS) surface with rough features that had varying optical properties when compressed under low loads. Correlation of the optical properties with the applied forces yielded a sensor sensitive to forces below 50 N. This method, while useful, requires optical reflection microscopy or similar optical sensing to take measurements. This is difficult to achieve within the confined space of a robotic leg. Another conventional engineered surface used micropyramids of PDMS coated with PEDOT:PSS/PUD in order to create a piezoresistive electrode. Using a counter-electrode plane and an applied voltage, the sensor's current varied based on deformation (similar to resistive sensors). Fundamentally, these sensors improve upon resistive film sensors, but they require specialized manufacturing techniques, scales and tolerances outside the scope of tools available for certain RLG applications.

Another promising ground contact sensing technique reviewed is based on barometric pressure sensors cast in a variety of compliant materials such as elastomers. Here, contact forces lead to the deformation of an elastomer, which in turn produces a pressure change on a barometric pressure sensor embedded in the elastomer. With suitable calibration, the barometric pressure change can be converted to an accurate contact force measurement. Another conventional approach employed a fiberglass and elastomer composite structure on a series of pressure sensors as a ground contact foot sensor. One conventional approach used a foam core and rubber exterior as the interface between the contact surface and pressure sensor. Another conventional approach required rubber directly cast onto barometric pressure sensors in an array. Although successful, all of the aforementioned investigations involve direct casting of rubber onto the sensor which fundamentally limits the achievable sensing characteristics. Further, these previous works relied solely on experimental calibration of the sensor (or sensor array) to determine its force sensing characteristics. The direct casting of rubber onto the pressure sensor limits the force sensitivity and also raises concerns for sensor damage. By exposing the barometric sensor directly to the encapsulating elastomer—in particular by exposing the port where pressure changes are measured—it is possible to damage the MEMS electronics used within the sensor to measure pressure changes.

Therefore, there is a desire for improved sensors that address one or more of the problems discussed above. Various embodiments of the present invention provide such sensors.

BRIEF SUMMARY OF THE INVENTION

The present invention relates to sensing devices. An exemplary embodiment of the present invention provides a sensing device comprising a pressure sensor, a sensor housing, and a deformable cover. The sensor housing can comprise a sensor cavity disposed within the sensor housing. The pressure sensor can be disposed within the sensor cavity. The deformable cover can be disposed adjacent to the sensor housing. The deformable cover can comprise a deformable cavity. The deformable cavity can be in fluid communication with the sensor cavity. The deformable cavity and the sensor cavity can contain a fluid, such that when an external force is applied to a surface of the deformable cover, the deformable cavity deforms and alter a volume of the deformable cavity to alter a pressure sensed by the pressure sensor.

In any of the embodiments disclosed herein, the sensor cavity can comprise a first end and a second end, wherein the pressure sensor is positioned proximate the first end of the sensor cavity, and wherein the deformable cavity is positioned proximate the second end of the sensor cavity.

In any of the embodiments disclosed herein, the sensor cavity can be non-deformable.

In any of the embodiments disclosed herein, the deformable cover can comprise a polymer.

In any of the embodiments disclosed herein, the polymer can be an elastomer.

In any of the embodiments disclosed herein, the pressure sensor can be a MEMs barometric pressure sensor.

In any of the embodiments disclosed herein, the deformable cover can cover an outer surface of the sensor housing.

In any of the embodiments disclosed herein, the deformable cover can be semi-spherically-shaped.

In any of the embodiments disclosed herein, the sensing device can be configured to detect forces applied to a surface of the deformable cover as low as 1 millinewton.

In any of the embodiments disclosed herein, the sensing device can further comprise a housing comprising an aperture, wherein the pressure sensor is disposed within an interior of the housing, and wherein at least a portion of the deformable cover extends through the aperture to an exterior of the housing.

In any of the embodiments disclosed herein, the sensing device can be capable of withstanding a force applied to a surface of the deformable cover of 10 kilonewtons without damaging the sensor device.

In any of the embodiments disclosed herein, the fluid can be compressible.

Another exemplary embodiment provides a sensing device comprising a pressure sensor, a deformable cover, and a deformable cavity positioned between the sensor and the deformable cavity. The deformable cavity can comprise a fluid. The sensing device can be configured such that a force applied to an outer surface of the deformable cover causes a volume of the deformable cavity to change, altering a pressure sensed by the pressure sensor.

In any of the embodiments disclosed herein, the sensing device can further comprise a sensor cavity having a fixed volume, wherein the pressure sensor can be disposed within the sensor cavity, and wherein the sensor cavity can be in fluid communication with the deformable cavity.

Another exemplary embodiment provides a sensing device comprising a pressure sensor, a sensor housing, an elastomeric deformable cover, and an outer housing. The sensor housing can comprise a sensor cavity disposed within the sensor housing. The pressure sensor can be disposed within the sensor cavity. The elastomeric deformable cover can be disposed adjacent to the sensor housing. The deformable cover can comprise a deformable cavity. The deformable cavity can be in fluid communication with the sensor cavity. The outer housing can comprise an aperture. The sensor housing can be disposed within an interior of the outer housing. At least a portion of the deformable cover can extend through the aperture to an exterior of the outer housing. The deformable cavity and the sensor cavity can contain a compressible gas, such that when an external force is applied to a surface of the deformable cover, the deformable cavity deforms and alters a volume of the deformable cavity to alter a pressure sensed by the pressure sensor.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The following Detailed Description of the Invention is better understood when read in conjunction with the appended drawings. For the purposes of illustration, there is shown in the drawings exemplary embodiments, but the subject matter is not limited to the specific elements and instrumentalities disclosed.

FIG. 2 provides simulation domain and finite element mesh for the behavior of an elastomer encapsulated force sensor with engineered air cavity, in accordance with an exemplary embodiment of the present invention.

FIGS. 3a-c provide an experimental sensor characterization setup where FIG. 3a shows the load cell mounted on a Tormach PCNC 1100 Mill with a 19.05 mm radius indenter and the sensor beneath the indenter, FIG. 3b shows the system mounted with a flat plate, and FIG. 3c with a 6.35 mm radius indenter, in accordance with an exemplary embodiment of the present invention.

FIG. 4a provides a baseline sensor on an experimental PCB, and FIG. 4b provides a baseline sensor cut view showing internal air cavities and dome structure, in accordance with an exemplary embodiment of the present invention.

FIG. 11a provides finite element results showing contours of vertical displacement for a target sensor design, FIG. 11b illustrate numerically predicted and experimentally measured pressure ratio $\tilde{P}=P_d/P_0$ vs. applied force, and FIG. 11c is a photograph of a manufactured sensor mounted on PCB5, in accordance with an exemplary embodiment of the present invention.

FIGS. 12a-e provide photographs of a single sensor robotic leg for ground testing, in which FIG. 12a illustrates a single elastomer encapsulated sensor with its polymeric shield shown in FIG. 12b, in accordance with an exemplary embodiment of the present invention. FIGS. 12c-d provide photographs showing force feedback control of a prototype RLG with FIG. 12c showing the suspended prototype, FIG. 12d showing the instance of first contact, and FIG. 12e showing both robotic feet on the ground, in accordance with an exemplary embodiment of the present invention.

FIG. 14a provides a schematic of a three-force sensor array used in experiments, and FIG. 14b provides a photograph of an indentation experiment at a CNC controlled location within the array, in accordance with an exemplary embodiment of the present invention.

FIGS. 17a-c provide force location and magnitude estimation results in an exemplary sensor array, in which FIG. 17a shows estimated $\hat{x}_F$ with the filter's uncertainty, $\hat{\sigma}_x$ and actual horizontal X location, $x_F$, FIG. 17b shows estimated $\hat{y}_F$ with the filter's uncertainty, $\hat{\sigma}_y$, and actual vertical Y location, $y_F$, while FIG. 17c shows the estimated force, $\hat{F}$, and applied force $F_{applied}$, in accordance with an exemplary embodiment of the present invention.

DETAILED DESCRIPTION OF THE INVENTION

To facilitate an understanding of the principles and features of the present invention, various illustrative embodiments are explained below. To simplify and clarify explanation, the invention is described below as applied to pressure/force sensors. One skilled in the art will recognize, however, that the invention is not so limited. Instead, as those skilled in the art would understand, the various embodiments of the present invention also find application in other areas, including, but not limited to, other types of sensors.

The components, steps, and materials described hereinafter as making up various elements of the invention are intended to be illustrative and not restrictive. Many suitable components, steps, and materials that would perform the same or similar functions as the components, steps, and materials described herein are intended to be embraced within the scope of the invention. Such other components, steps, and materials not described herein can include, but are not limited to, similar components or steps that are developed after development of the invention.

Figure 21:
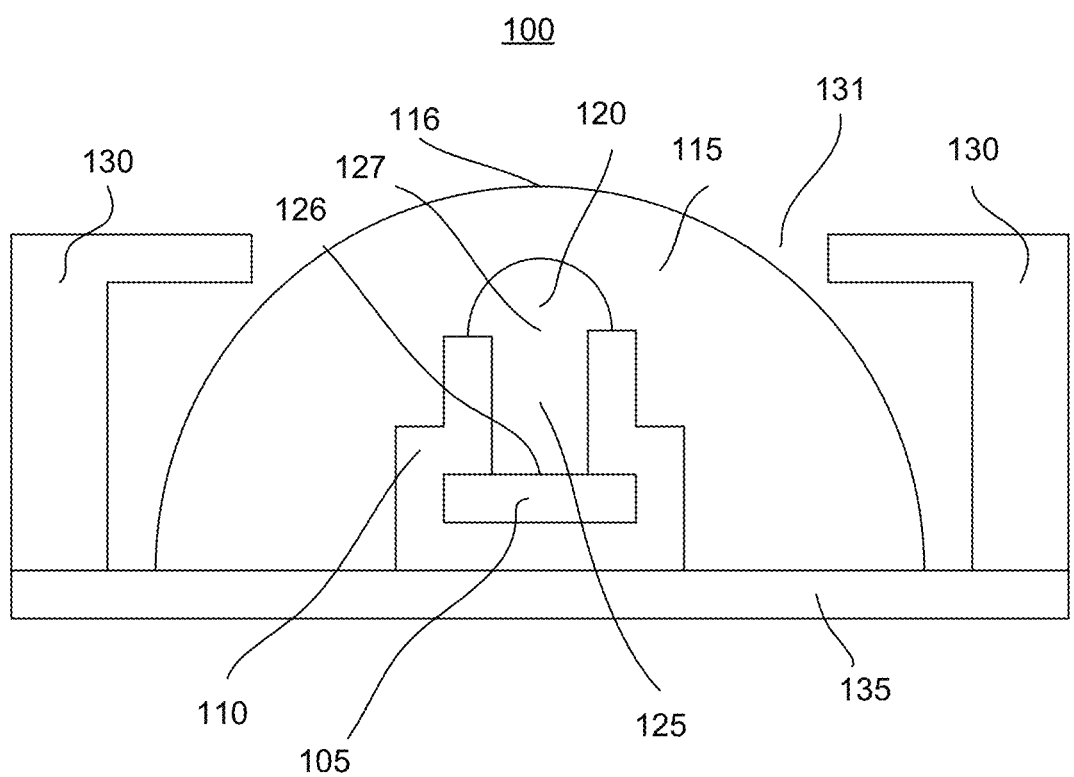
FIG. 21 provides a schematic of a sensing device, in accordance with an exemplary embodiment of the present invention.

As shown in FIG. 21, an exemplary embodiment of the present invention provides a sensing device 100. The sensing device comprises a pressure sensor 105, a sensor housing 110, and a deformable cover 115. The pressure sensor can be many different pressure sensors known in the art, including, but not limited to, a barometric pressure sensor, a MEMs barometric pressure sensor, and the like.

The sensor housing 110 can comprise a sensor cavity 125 disposed within the sensor housing. As shown in FIG. 21, the sensor housing includes side walls defining the sensor cavity. The sensor cavity 125 can comprise a first end 126 and a second end 127. The pressure sensor can be disposed at the first end 126 of the sensor cavity. The invention, however, is not so limited. The pressure sensor 105 can be disposed any many different positions with respect to the sensor cavity 125 in accordance with various embodiments. Additionally, in some embodiments, the sensor cavity is not deformable, i.e., its internal volume is substantially constant.

The sensing device 100 can also comprise a deformable cover 115 disposed adjacent to the sensor housing 110. For example, as shown in FIG. 21, the deformable cover 115 can cover the entirety of the sensory housing 110. In some embodiments, however, the deformable cover 115 covers only a portion of the sensor housing 115. The deformable cover can be many different shapes depending on a desired application of the sensing device 100. For example, as shown in FIG. 21, the deformable cover is semi-spherically-shaped, i.e., dome-shaped. The deformable cover can also be made of many different materials so long as the deformable cover is still permitted to deform in response to an external force applied to an outer surface 116 of the deformable cover 115. Exemplary materials include, but are not limited to, polymers, elastomers, rubbers, rubber composites including glass or carbon fiber reinforced polymer composites, combinations thereof, and the like.

The deformable cover 115 can also include a deformable cavity 120 disposed therein, for example, as shown in FIG. 21. The deformable cavity 120 can be many different sizes or shapes depending on the application of the sensor. The deformable cavity 120 has an interior volume that can contain a fluid. The fluid can be many different fluids. In some embodiments, the fluid is a compressible fluid, such as a compressible gas, e.g., air. In other embodiments, the fluid is non-compressible.

Figure 1:
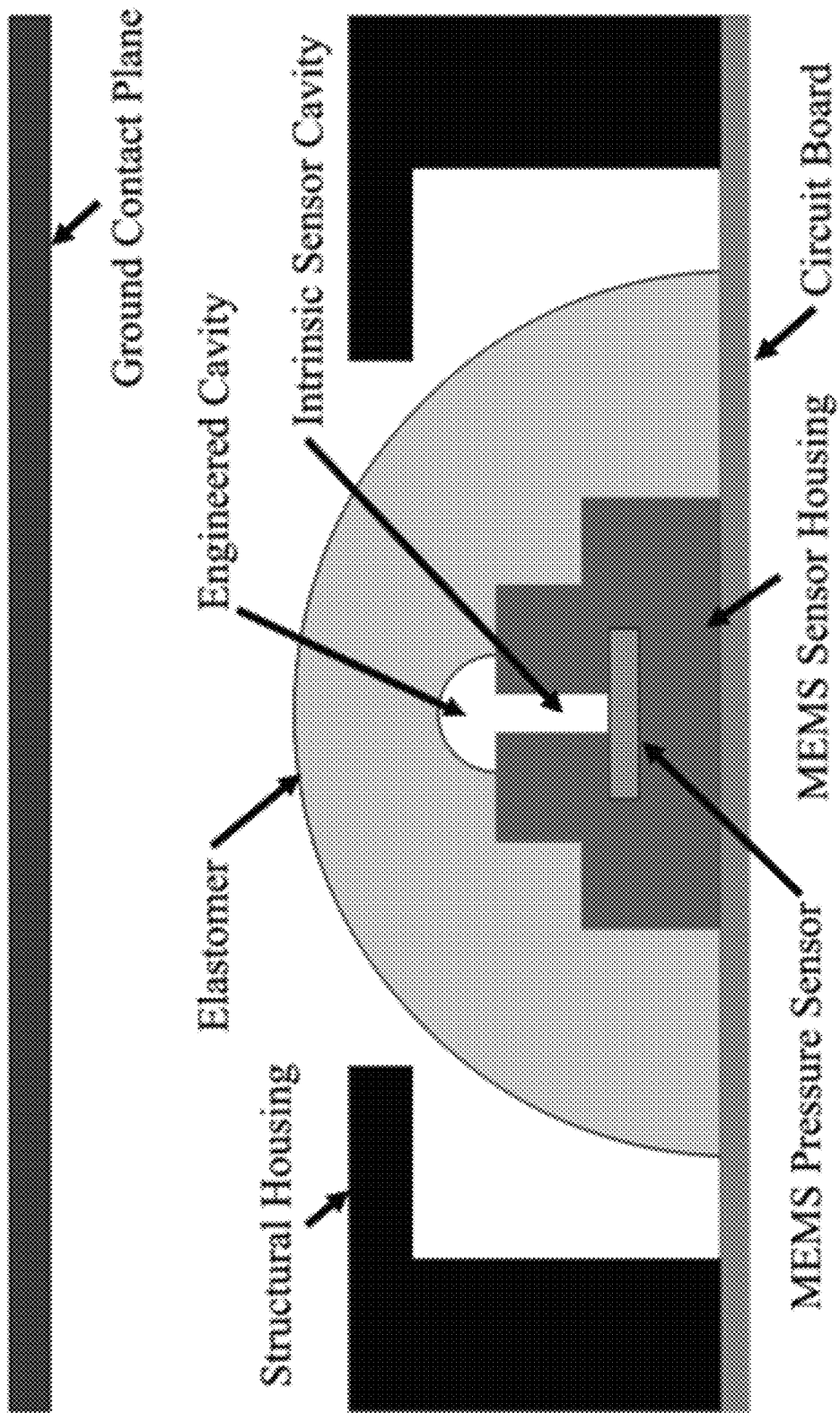
FIG. 1 provides a schematic of a sensing device, in accordance with an exemplary embodiment of the present invention.

The deformable cavity 120 can be in fluid communication with the sensor cavity 125, such that the fluid is contained in both the deformable cavity and the sensor cavity. As can be seen in FIG. 1, an external force applied to a surface 116 of the deformable cover 115 can cause the deformable cavity 120 to deform, thus altering the internal volume of the deformable cavity, e.g., decreasing the internal volume. That alteration of the volume causes a pressure change (e.g., increase) inside the deformable cavity and sensor cavity. That pressure change, which correlates to the force applied to the surface 116 deformable cavity, is sensed by the pressure sensor 105. Accordingly, the sensing device is capable of measuring at least the magnitude (and, in some embodiments, depending on device configuration or orientation of components therein, the direction) of the force applied to the surface 116 of the deformable cover 115.

It should be recognized, however, that some embodiments do not include a distinct sensor cavity. Rather, in some embodiments, the pressure sensor 105 can be disposed in the deformable cavity 120. Thus, just as discussed above, changes in the internal volume of the deformable cavity 120, result in an internal pressure change measured by the pressure sensor 105, which correlates to a force applied to a surface 116 of the deformable cover 115.

As shown in FIG. 21, the sensing device 100 can further comprise a housing 130. The housing 130 can serve to protect other components of the sensing device from outside forces. The housing 130 can include an aperture, i.e., opening 131. Various components of the sensing device 100, such as the pressure sensor 105, sensor housing 110, deformable cavity 120, and portions of the deformable cover 115 can be contained within the interior of the housing 130. In some embodiments, as shown in FIG. 21, a portion of the deformable cover can extend through the aperture 131. In such embodiments, the housing 130 can serve to protect the sensing device 100 by allowing forces applied to the surface 116 of the deformable cover 115 to be measured, but preventing the deformable cover 115 from deforming, under very high forces, to an extent to which other components of the sensing device 100, e.g., the pressure sensor 105, would become damaged. In other words, the housing 130, can serve to limit the amount of deformation of the deformable cover 115, thereby protecting the sensing device.

The use of the housing 130 can permit the sensing device to measure small forces, e.g., as low as 1 millinewton, while protecting the device against large forces, e.g., up to 10 kilonewtons. The sensitivity and durability of the sensing device can be altered through the use of different geometries of the deformable cover 115 and housing 130 as well as by altering the materials used for those components.

The sensing device can further comprise a printed circuit board (PCB) 135. The pressure sensor 105 can be in electrical communication with the PCB 135.

EXAMPLES

An exemplary force sensor will now be described. The exemplary force sensor is shown conceptually in FIG. 1. It comprises a MEMS barometric pressure sensor, an engineered elastomer adhered to that MEMS absolute pressure sensor with an air cavity at the interface between the elastomer and pressure sensor, and a protective structural housing. By design, if the elastomer undergoes deformation by the ground contact surface/plane, the air cavity deforms reducing the total cavity volume and increasing the pressure within the cavity. Therefore, by controlling the mechanical behavior of the elastomer (i.e. its geometry and mechanical properties), as well as the air cavity geometry, it is possible to fine tune the transducer characteristics of the sensor. Further, the sensor is designed such that a portion of the elastomer protrudes from a structural housing. Under load, for example from ground contact, the elastomer will deform until the loading surface contacts the structural housing at which point the housing itself will take up the load. This design allows the force sensor to have high sensitivity at small loads, when the elastomer is being deformed, while still being able to withstand very large loads where the structural housing acts as the load bearing structure. The use of an elastomer-based sensor, which incurs large deformation at small loads, enables this manner of design where the sensor is shielded from large loads by deforming into a structural housing.

The air cavity interfacing the elastomer and MEMS pressure sensor comprises two volumes. The first volume is defined by the engineered elastomer, and it is denoted as the engineered cavity (referred to above as a deformable cavity), $V_{0,c}$. The second volume is inherent in the particular MEMS sensor chosen, and it is referred to as the intrinsic sensor volume (referred to above as the sensory cavity), $V_{0,s}$. The intrinsic sensor volume is a measurable feature of many commercial sensors while the engineered cavity is a controllable geometric feature. During practical operation, the elastomer structure, and therefore the engineered air cavity, deforms under load. This generates an increase in air pressure until the engineered volume is completely filled and the pressure remains constant.

The sensor has initial pressure and volume, $P_0$ and $V_0 = V_{0,c} + V_{0,s}$, and deformed pressure and volume, $P_d$ and $V_d = V_e + V_{0,s}$, where in writing $V_d$, it is assumed that during deformation only the engineered air cavity volume $V_e$ is changing. The pressure changes may be related to the volume changes to find the normalized pressure, $\tilde{P} = P_d/P_0$, through $$\tilde{P} = \frac{P_d}{P_0} = \frac{V_0}{V_d} = \frac{V_{0,e} + V_{0,s}}{V_e + V_{0,s}} \qquad \text{Equation 1}$$

where for simplicity, the air is treated as an ideal gas at a constant temperature. In the case of a completely collapsed engineered air cavity, that is $V_e = 0$, Equation 1 reduces to the theoretical maximum normalized pressure, $\tilde{P}_{max}$, as $$\tilde{P}_{max} = \frac{P_{d,max}}{P_0} = 1 + \frac{V_{0,e}}{V_{0,s}} \qquad \text{Equation 2}$$

This relation assumes that under max loading the elastomer will not penetrate the intrinsic sensor air cavity such that $V_{0,s}$ remains unchanged.

Equation 2 serves as a simple but useful design guideline as it may be used to compute a maximum allowable engineered volume to prevent sensor damage from occurring due to overpressuring. That is, for a given sensor with a maximum operating pressure (and known sensor volume $V_{0,s}$), one may engineer the elastomer such that the maximum operating pressure is never exceeded. This behavior is demonstrated experimentally below. The sensitivity of the force sensor, that is its contact force vs. pressure characteristics, relates to the mechanical behavior of the elastomer itself and is discussed below.

Numerical Modeling and Experimental Characterization

A numerical model of the sensor to explore the role of elastomer dome geometry and material properties on sensor performance was developed. In parallel, various force sensors to validate our numerical tools and provide additional insight were manufactured and experimentally characterized. A goal of exploring each property is to generate a qualitative and quantitative set of design-performance rules which in turn enable the rational design of a force sensor with a required sensitivity and saturation pressure. Towards this goal, a Finite Element Model description of the force sensor was developed. In parallel, a manufacturing and experimental characterization process was built to compare numerical predictions and experimental measurements of sensor performance. As a proof of concept, the design-performance rules developed herein are supplied below when discussing the design and field testing of a sensor for the RLG for rotorcraft application.

Numerical Modeling

The commercial finite element package was used to develop a model of the elastomer encapsulated sensor. For simplicity, the geometry is assumed radially symmetric about the axis shown in FIG. 2. In the model, an analytical rigid surface, initially set above the elastomer as called out in FIG. 2 is prescribed a constant velocity and used to indent/deform the mesh by a prescribed amount. The reaction force on the analytical surface is computed and can be compared to an experimentally applied force. The elastomer material is modeled as an isotropic, hyperelastic material with a Neo-Hookean strain energy potential. As such, the model does not incorporate any viscous (rate-dependent) mechanisms and will inherently not describe any hysteretic behavior. The MEMS sensor, and its accompanying intrinsic air volume is modeled through the rigid elements shown in FIG. 2. With respect to the notes denoted in FIG. 2, the nodes along the line AB have zero radial displacement in the horizontal (radial) direction. The nodes along BC, which represent the inside of the engineered air cavity, are free to deform onto the rigid elements shown. The rigid elements act as the contact surface of the sensor housing. The nodes along the edge between points C and D are fixed, modeling perfect adhesion between the elastomer, MEMS sensor, and PCB. Finally, the nodes along the edge between points A and D are prescribed a contact condition with the rigid analytical surface. At each contact surface—either between the indenter and the elastomer, or the elastomer and the MEMS sensor—an isotropic friction coefficient is assigned. As a baseline, this coefficient is set to 0.5 for all simulations unless otherwise noted. Results from this numerical model are presented below.

TABLE 1

PROPERTIES, VARIED IN NUMERICAL FINITE ELEMENT MODELING OF SENSOR PERFORMANCE

| Geometric | Material |
| --- | --- |
| Engineered Volume | Indenter/Polymer Friction |
| Elastomer Shape | Sensor/Polymer Friction |
| Adhered Surface Area | Shore Hardness |

Table I summarizes the geometric and material properties varied in the numerical model to analyze their effect on sensor performance. Due to the finite element models inviscid material assumption, we do not simulate or analyze loading rate as it would have no effect. The elastomer material properties considered are limited to a select set of silicone products manufactured by Smooth-On since these are readily available and easy to manufacture for experimental comparison. The Shore A hardness provided by the manufacturer, was converted using ASTM D2240 and the experimental work of others to a ground state shear modulus. This shear modulus may be input to the constitutive model in the finite element model. The Poisson ratio for silicone elastomers was assumed to be v=0.45 based on experimental data, which is in agreement with the near incompressible behavior of elastomeric materials. Specifically used for the elastomeric structure were Mold Max 10 (MM10), which has a Shore 10A hardness and corresponding shear modulus of $G0 \approx 0.136$ MPa and bulk modulus of $K \approx 1.311$ MPa, as well as Mold Max 20 (MM20), which has a Shore 20A hardness and corresponding shear modulus of $G0 \approx 0.228$ MPa and bulk modulus of $K \approx 5.63$ MPa. These material properties fully define the Neo-Hookean constitutive model used to characterize the elastomeric materials in the FEA model.

Experimental Setup

All experiments make use of Honeywell TruStability MEMS Pressure Sensors with a measurable pressure range between 0 and 202 kPa and I2C digital communication. The internal volume of air within the sensor is $V_{0,s} \approx 75$ mm$^3$ with a standard deviation of 0.57 mm$^3$ based on measurements from four sensors. In order to perform repeatable and automated experiments, a characterization setup was developed using a CNC mill which allowed for repeatable, accurate, and automated experimentation. As shown in FIG. 3, a Transducer Techniques DSM-50 load cell was mounted on the cross-head of the CNC mill. This load cell has a threaded attachment point such that various kinds of fixtures may be used to indent the pressure sensor as shown in FIG. 3. The cross-head provides vertical displacement accuracy up to 0.0127 mm and a consistent indentation speed of 0.85 mm/s while the load cell and signal conditioner output a 12-bit force measurement up to 225N. This is sufficient for quasi-static force-pressure response measurements of the sensor. An aluminum vice was used to mount the force sensor to the base of the CNC mill while minimizing any deformations other than those of the elastomer dome during indentation. The force from the load cell and pressure from the force sensor were captured using a National Instruments DAQ board synchronously recorded at $\approx$30 Hz, which is sufficient to sample data points up to the maximum tested loading speed of 24.13 mm/s.

TABLE II

PROPERTIES VARIED IN EXPERIMENTAL CHARACTERIZATION OF SENSOR PERFORMANCE

| Variable | Tested Values |
| --- | --- |
| Engineered Volume (mm$^3$) | 17.5; 65 |
| Indenter Shape | 6.35 & 19.05 mm radius domes.; flat plate |
| Elastomer Structure | 25.4 mm diameter dome; 25.4 mm side length cube, |
| Elastomer Material | Mold Max 10; Mold Max 20 |

An array of experiments were conducted using the variables and values listed in Table II. These variables represent the set of physical (geometric), material, or loading properties which can be quantitatively compared to the simulated numerical simulations and which are expected to govern the behavior of these sensors. In experimental characterization, the effect of friction between the indenter and the ground force sensor was not considered since it is difficult to characterize. This property will however be explored numerically. Before presenting the numerical and experimental results, a baseline force sensor was established from where the effect of varying various sensor properties on its performance can be quantified. The baseline force sensor—shown in FIG. 4 adhered on a Honeywell MEMS pressure sensor—is made from Mold Max 10 (MM10), has a $V_{0,c}$=17.5 mm$^3$ engineered air cavity volume and a 25.4 mm diameter elastomer dome adhered to the pressure sensor. The $V_{0,e}$=17.5 mm$^3$ engineered volume and measured $V_{0,s}$=75 mm$^3$ sensor internal volume yield a theoretical $\tilde{P}$ of 1.23, well within the specification of the pressure sensor ($\tilde{P} \approx 2.0$). The baseline experiment is characterized by a flat plate (see FIG. 3.b) compressing the sensor at a displacement rate of 0.85 mm/s. This loading rate represents a quasi-static loading condition.

Sensor Manufacturing

Figure 5:
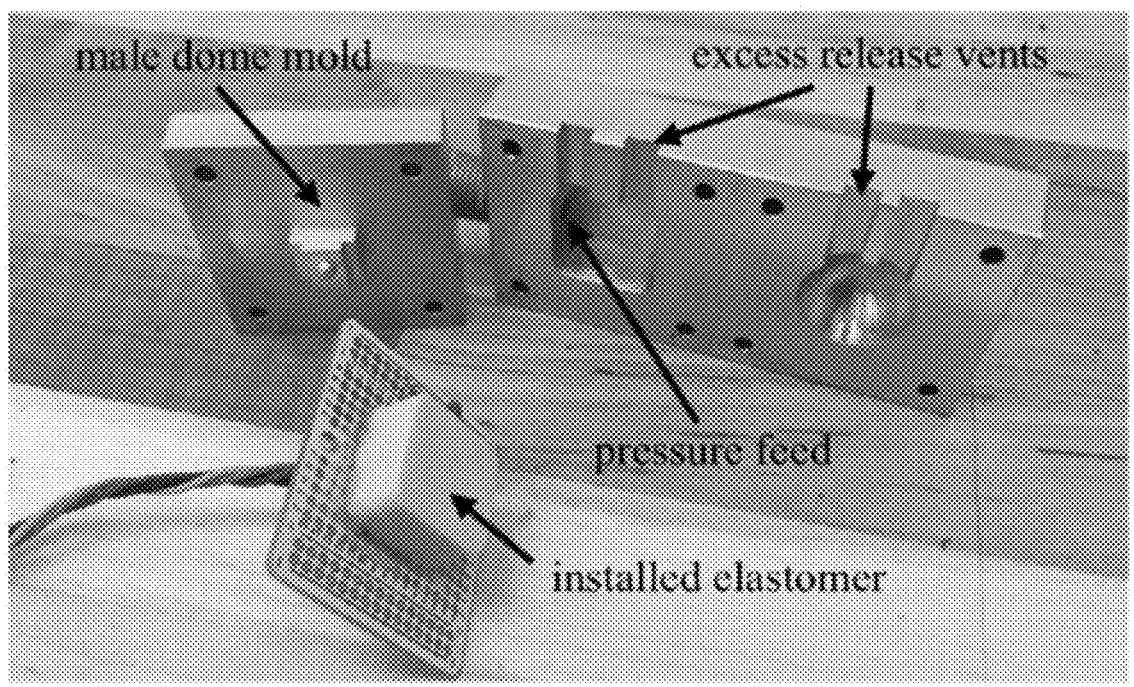
FIG. 5 provides two-part mold components for manufacturing of the elastomer dome, in accordance with an exemplary embodiment of the present invention.

The force sensors are manufactured in a three-step process. First, the elastomer structure is cast in a rigid mold separate of the pressure sensor to ensure the desired engineered cavity geometry. This is in distinct contrast to previous designs where the polymer is cast directly onto the pressure sensor. This casting process can be accomplished with only millimeter scale manufacturing techniques, which provides an important benefit in complexity and cost reduction over sensors requiring micrometer scale manufacturing. The two-part mold used to create round and/or rectangular prism elastomer structures is shown in FIG. 5, where an example of a completed sensor with a square prismatic elastomer is also shown. Prior to casting, the silicone elastomer is mixed and degassed in a vacuum chamber for 5 minutes. Then, a handheld pressure feed system is used to push the elastomer into the mold through a nozzle, see FIG. 5. Excess air and liquid elastomer escapes through release vents. This ensures that the cured elastomer structure will have minimal voids or other imperfections that can result from a pour-over method at such a small scale. It is important to note that the process described here is amenable to large scale manufacturing where domes can be mass produced through injection molding.

Once cast, the elastomer dome is adhered to the pressure sensor and electronics board using two adhesives. The first adhesive is a primer and cyanoacrylate combination. This combination is applied at the interface between the MEMS pressure sensor and the elastomer near the engineered cavity, that is near reference point C in FIG. 2. This adhesive provides a stiff bond. However, it does not fill any possible gaps and hence does not provide a perfect air-tight seal. For this, an industrial grade silicone RTV sealant is applied near the base of the sensor at the interface of the elastomer, the MEMS pressure sensor, and the circuit board. The silicon adhesive covers the remaining surface between points C and D in FIG. 2. In combination, these adhesives provide a secure, air-tight bond between the elastomer and the pressure sensor.

Analytic and Experimental Results

Figure 6:
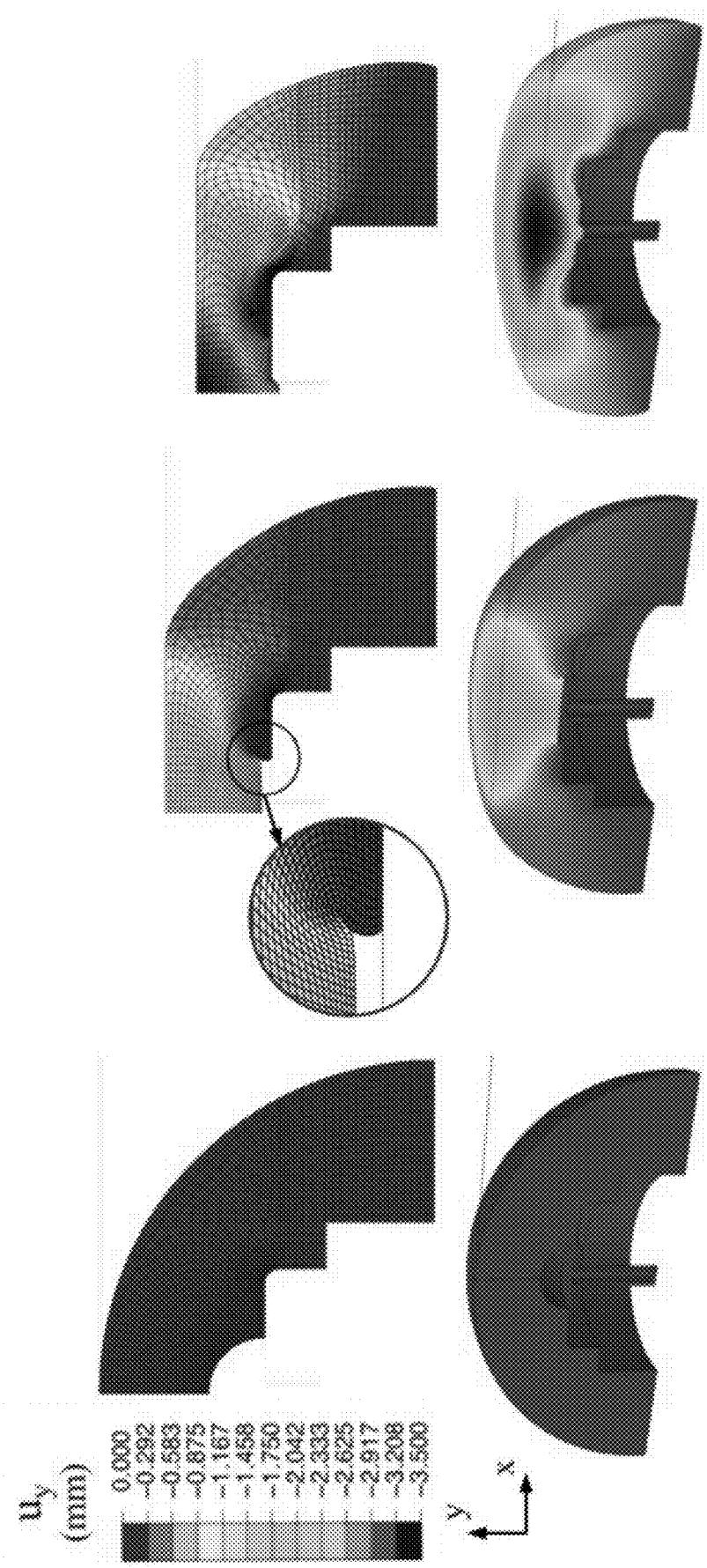
FIG. 6 provides finite element results showing contours of vertical displacement, $u_y$, for a baseline sensor design, in which the bottom row shows the simulation domain revolved 180 degrees with the FEA mesh hidden, and the top middle inset highlights the manner in which the elastomer folds over itself during collapse of the engineered air cavity, in accordance with an exemplary embodiment of the present invention.

This section presents and compares the numerical predictions and experimental results of the exemplary force sensor's response. FIG. 6 shows a representative simulation result where contours of vertical displacement are shown for the baseline force sensor design. Beyond providing quantitative data, these numerical simulations give qualitative insight into the elastomer deformation process that reduces the engineered cavity volume and increases pressure. As seen in FIG. 6, as the sensor deforms the elastomer begins to fold onto itself until the original volume of the engineered cavity is filled with elastomer. Finally, once the air cavity completely collapses a minimal amount of elastomer is forced into the sensor cavity. This agrees well with the design assumption discussed above wherein it was assumed that the maximum measured pressure of the sensor will be due to a complete collapse of the engineered volume, $V_{0,e}$, without changes to the volume of air, $V_{0,s}$, within the sensor.

Figure 7A:
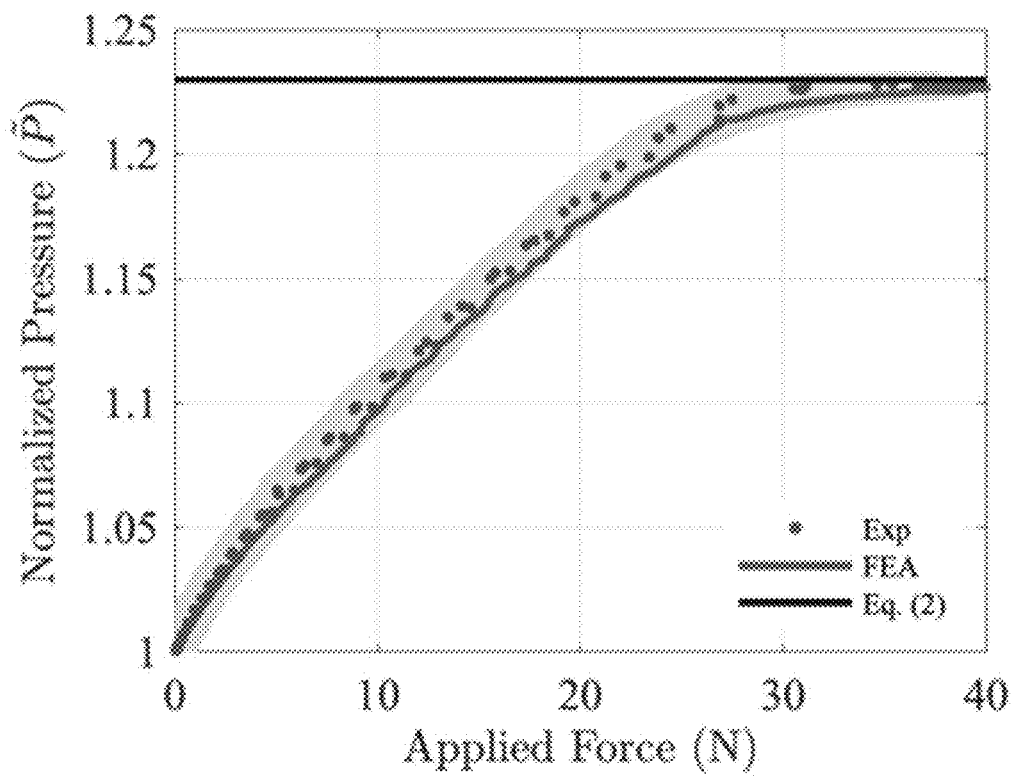
FIGS. 7a-f provide numerically predicted and experimentally measured pressure ratio $\tilde{P}=P_d/P_0$ vs. applied force showing the: (a) exemplary baseline sensor design; (b) role of using flat plate (baseline) vs. 6.25 mm radius indenter; (c) role of varying the engineered air cavity volume between $V_{0,e}=17.5$ mm$^3$ (baseline) and $V_{0,e}=65$ mm$^3$; (e) role of varying the elastomer structure at constant engineered volume between a dome structure (baseline) and a rectangular prism; (e) role of varying the elastomer material properties between MM10 (baseline) and MM20; and (0 Role of surface friction at the interface of the indenter/elastomer and of the elastomer/pressure sensor, in accordance with an exemplary embodiment of the present invention.

1) Baseline Sensor Response & Results With Varying Indenter Shape: The first comparison is between the numerically predicted and experimentally measured behavior of the baseline sensor. The results of this comparison are shown in FIG. 7(a). All of the results in FIG. 7 are presented as a normalized pressure ratio, $\bar{P}$ vs. the applied force during loading and unloading of each considered sensor. The applied force is either measured experimentally through the load cell or numerically through the reaction force on the rigid analytical surface. All experimental measurement uncertainties are shown as shaded regions around the provided data. With respect to measurement uncertainty, there are two sources. First, there is uncertainty of 515 Pa from the chosen MEMS pressure sensor's accuracy. When normalized with the unloaded pressure, this nominally represents an uncertainty of 0.00509. Next, there is uncertainty from the load cell. Based on the specification for the given load cell, there is a 0.778 N uncertainty in measurements. These two uncertainties are used to formulate the shaded region around all experimental data. The horizontal line in FIG. 7(a) shows the theoretical $\tilde{P}_{max}$ of the baseline sensor for comparison to numeric and experimental results. The experimental data in FIG. 7(a) (points) shows a nearly linear relation between $\tilde{P}$ and the applied force until the response saturates. The nominal experimental sensitivity of the sensor between $\tilde{P}$ and applied force is approximately 0.00833 1/N with $R^2=0.991$ within the linear region of the response. This is computed using a standard linear regression of the experimental or numerical data, given the start and end points of the linear response. The linear response was defined from zero load to 75% of the saturation pressure. The experimental data has a $\tilde{P}_{max}=1.228$, within 0.4% of the analytic prediction using Equation 2. The FEA numerical prediction in FIG. 7(a) (solid line) is in good quantitative agreement with the experimentally measured response and has a $\tilde{P}_{max}=1.233$. It is crucial to note that this prediction is performed with no fitting parameters. The FEA predicts a sensor sensitivity of 0.00809 1/N with $R^2=0.994$. This result represents a 2.9% difference between the experimental and finite element sensitivity response results.

Figure 7B:
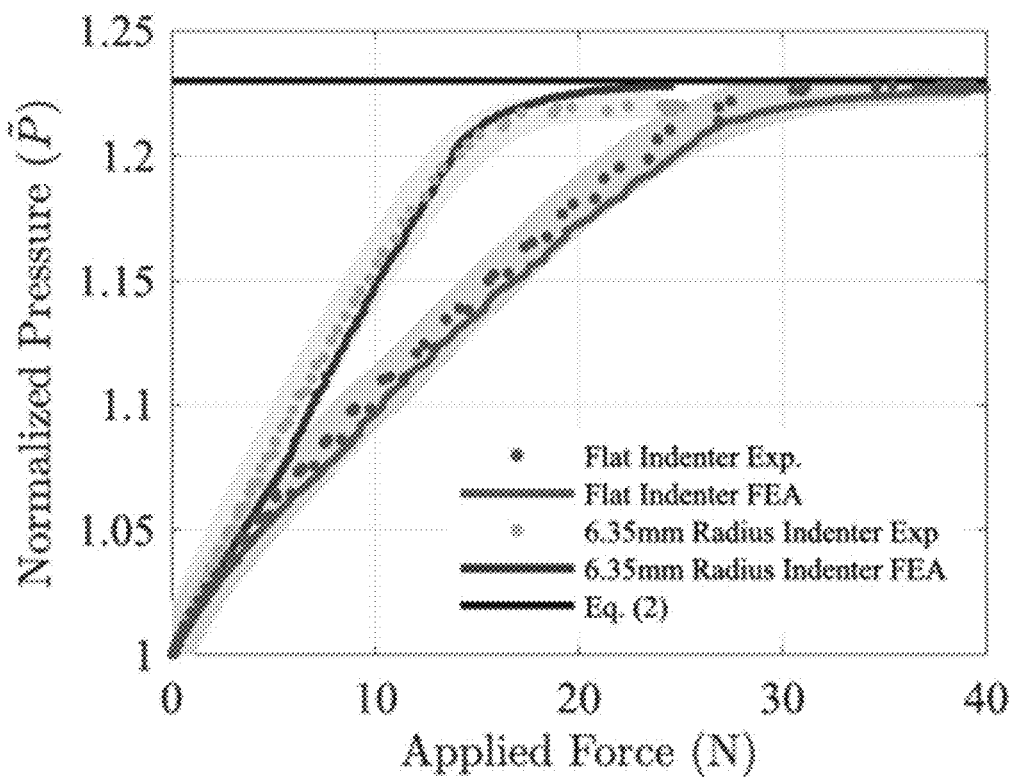

Having established a good quantitative agreement between the numerically predicted and experimentally measured sensor response, the role that the indenter or surface contacting the sensor has on its performance was investigated. FIG. 7(b) shows the sensor response, both numerical and experimental, for the baseline using a flat plate to deform the sensor and for an indenter with a tip radius of 6.35 mm (see FIG. 3). First, we note that the numerically predicted response closely matches the experimentally measured response again, which adds confidence that the numerical tool developed can be used to design the force sensor for a given set of target sensor characteristics. As shown in FIG. 7(b), the change from a flat plate to a domed indenter changes the sensitivity of the sensor where using the indenter yields a higher $\tilde{P}$ measurement at lower applied forces. This makes intuitive sense as the localized deformation caused by the indenter results in the air cavity within the elastomer collapsing at lower forces. Another way of thinking about this is that we are engaging less elastomer material (and hence requiring less force) in the process of collapsing the air cavity. For the 6.35 mm radius indenter, the nominal experimental sensitivity of the sensor is 0.0149 1/N (1.4% error from the FEA prediction) with $R^2=0.998$ and a Pmax of 1.215 (1.5% error from the analytic prediction). Importantly, $\tilde{P}_{max}$ is essentially unchanged by the use of either a flat plate or an indenter to deform the force sensor. This is attributed to the fact that the $\tilde{P}_{max}$, as discussed above, can be a function of only the geometry of the engineered volume.

Some discrepancies between the numerically predicted and experimental measured results in FIG. 7 are expected for various reasons, but it is emphasized again that the FEA model has no fitting parameters. Most variation is attribute to the fact that material properties assigned in the FEA model are taken from manufacturer reported shore A values and not from direct measurements of our as-cast materials. Further, geometric variations in the manufacturing process will also lead to some discrepancies between the numerical and experimental results. Still, as shown in FIG. 7, the numerical model developed is shown capable of quantitatively predicting sensor performance.

Figure 7C:
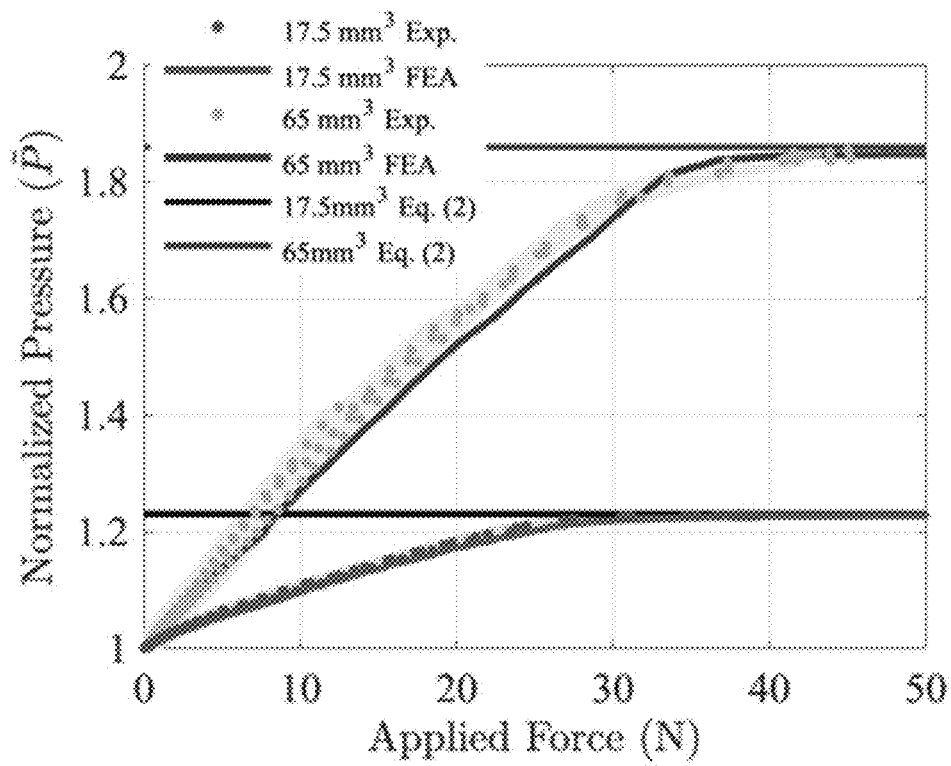

2) Results With Varying Engineered Volume & Varying Elastomer Geometry: Next we explore the effect of varying two critical geometric features on sensor performance. Namely, we explored variation of the engineered cavity volume, $V_{0,e}$, and variation of the exterior elastomer structure while maintaining $V_{0,e}$ constant. The engineered cavity volume was varied from the baseline of $V_{0,e}=17.5$ mm$^3$ to $V_{0,e}=65$ mm$^3$. FIG. 7(c) shows the results where increasing engineered volume results in an increase in the experimentally measured $\tilde{P}_{max}$ from the baseline sensor value of 1.228, to a value of 1.837. This change is captured by Equation 2, shown as horizontal lines in FIG. 7(c), which predicts the change in volume to raise the $\tilde{P}_{max}$ from 1.233 to 1.866. This further confirms that under these loading characteristics the air within the engineered volume behaves as an ideal gas and that $\tilde{P}_{max}$ is governed by the collapse and loss of the engineered volume. Again, the numerical FEA predictions, solid lines in FIG. 7(c), provide a good quantitative prediction of the experimental results. Given the increase in $\tilde{P}_{max}$ due to the increased $V_{0,e}$, the experimental sensor sensitivity is now 0.0269 1/N with $R^2=0.989$. It is important to note that changing the engineered volume results in an increased $\tilde{P}_{max}$ while maintaining the applied force required to reach $\tilde{P}_{max}$ constant. As such it can be an important design tool in controlling the sensitivity of the sensor as it effectively changes the sensitivity of the measured response to an applied force. The experimental sensor with increased engineered volume shown in FIG. 7(c) has three times the sensitivity as the baseline sensor with a smaller engineered volume. In essence, by increasing $\tilde{P}_{max}$ while maintaining the applied force at which this maximum is reached, the full range of the MEMS pressure sensor can be better utilized.

Figure 7D:
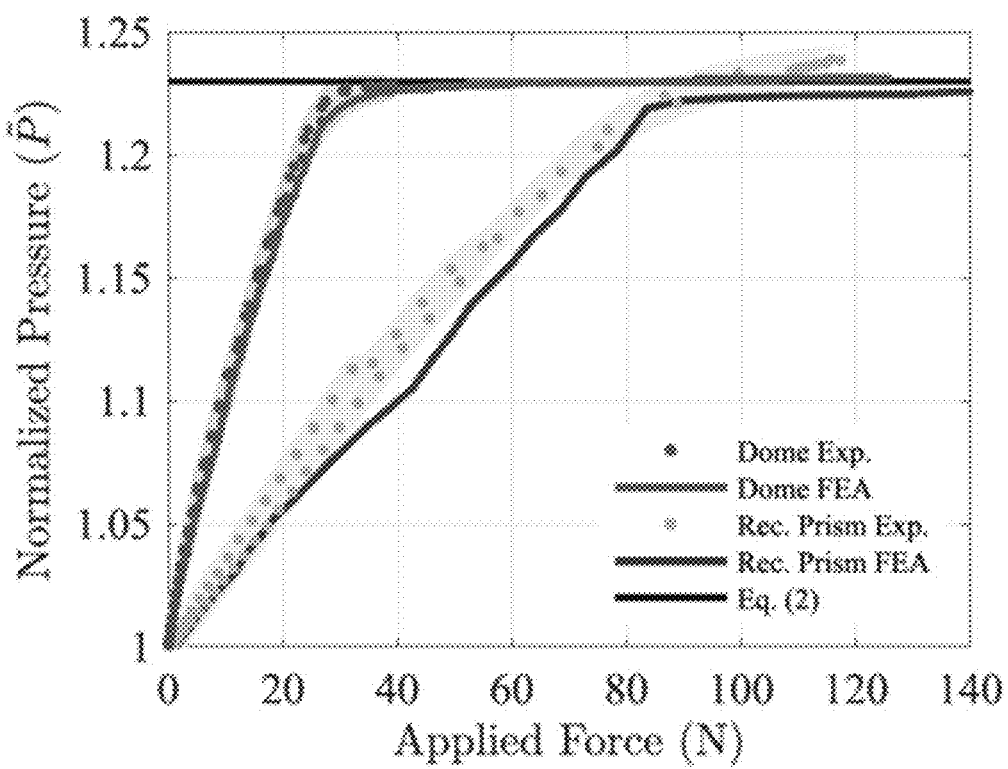

The next consideration focused on the overall geometry of the elastomer while maintaining the engineered volume constant. Here, the baseline sensor which has a domed shaped elastomer, see FIG. 4, is contrasted with a rectangular prism shaped sensor, see FIG. 5. The dimensions of both are provided in Table II. FIG. 7(d) shows the numerical predictions and experimental results for this comparison where it can be seen that the $\tilde{P}_{max}$ remains unchanged while the force required to reach saturation is significantly increased for the prismatic dome. Similar to the effect of changing from an indenter to a flat plate, varying the geometry from a dome to a rectangular prism results in more elastomeric material to be engaged and deformed in the process leading to the deformation and collapse of the engineered volume. As such, more force can be required to reach $\tilde{P}_{max}$ for the rectangular prism elastomer. With regards to sensor characteristics this translates to a reduced sensitivity where the rectangular prismatic elastomer sensor has an experimentally measured sensitivity of 0.00284 1/N with $R^2$=0.996. representing approximately a three-time reduction from the baseline sensor. Finally, it is noted that the consistent agreement between the numerically predicted and experimentally measured data. In the FEA model, to use an axisymmetric model, the rectangular prism is modeled through a cylindrical prism with equal surface area where contact occurs.

To summarize this Section: (i) changes in the engineered volume geometry can be used to tailor the $\tilde{P}_{max}$ achievable, with minimal changes to the applied force required to reach this pressure ratio, and (ii) changes to the elastomer structure may be used to tailor the applied force required to reach $\tilde{P}_{max}$ with no impact on the maximum itself. In combination then—and as will be demonstrated below—these geometric properties may be used to yield targeted sensor characteristics in a straight forward fashion.

Figure 7E:
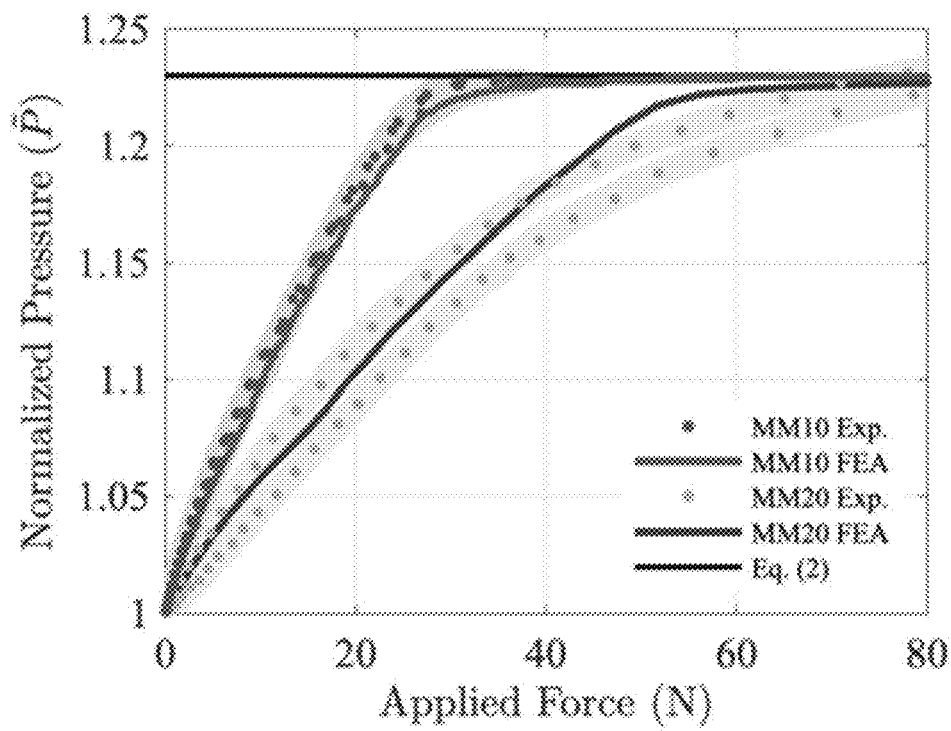

3) Results With Varying Material Properties & Varying Contact Friction: In FIG. 7(e) the baseline sensor manufactured with MM10, having Shore 10A hardness and an approximate shear modulus of G≈0.136 MPa, is compared with a sensor manufactured with MM20, having Shore 20A hardness and an approximate shear modulus of G≈0.228 MPA. As expected, the sensor with higher stiffness, that is higher shear modulus, requires a larger applied force to reach the $\tilde{P}_{max}$. This resulted in a sensitivity change from 0.00833 1/N of the baseline MM10 sensor to 0.0044 2 1/N with $R^2$=0.992 for the MM20 sensor; a 47% decrease in sensitivity. As expected, $\tilde{P}_{max}$ remains unchanged by the change in material properties. Therefore, similar to a change in the overall elastomer structure, variation of the elastomer material properties tailors the amount of applied force that is required to reach the $\tilde{P}_{max}$. This makes sense as the stiffness of the elastomer structure is dependent on both its geometry and its material properties. Finally, we note the overall consistent agreement between the numerically predicted and experimentally measured data.

Figure 7F:
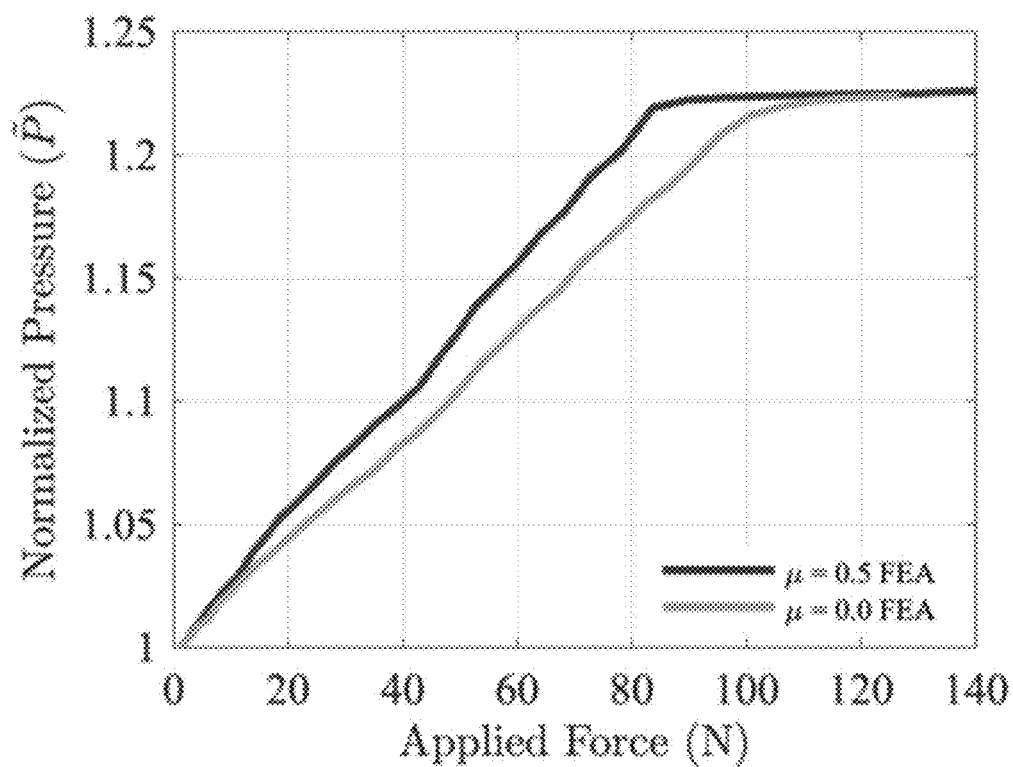
Figure 8:
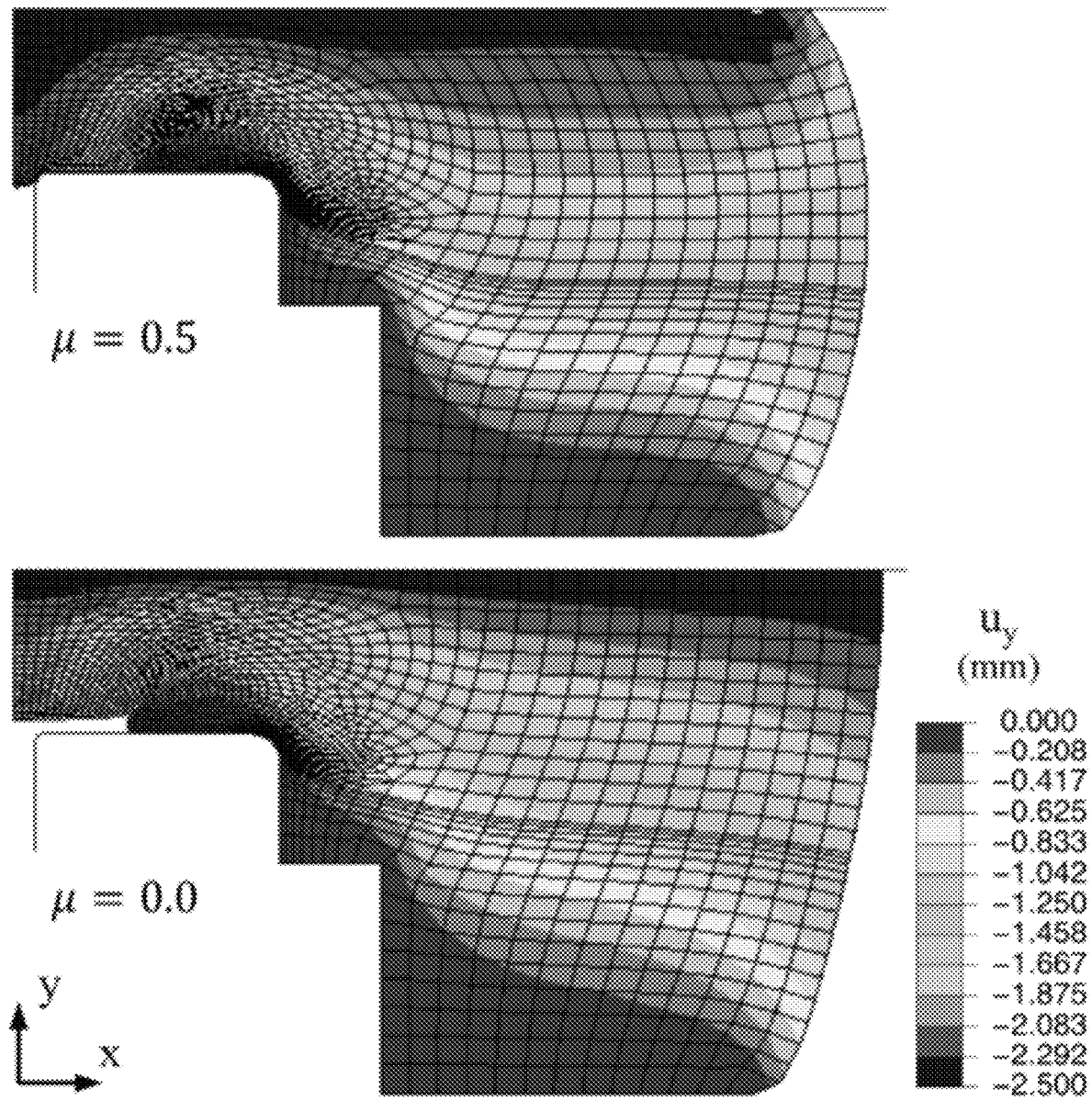
FIG. 8 provides finite element results showing contours of vertical displacement, $u_y$, with varying friction between the flat analytical surface and the elastomer, in which the results for $\mu=0.5$ (top) and $\mu=0$ (bottom) are shown at the same applied force of 85 N, in accordance with an exemplary embodiment of the present invention.

The frictional properties between the force sensor and the surface being used to deform the sensor could potentially be important. An experimental effort was not undertaken to quantify this effect as tailoring and measuring interfacial frictional properties is challenging. However, a numerical analysis was performed to investigate the effects of this property. FIG. 7(f) shows numerically predicted sensor response for two varying cases of the friction, $\mu$, between the flat surface and the elastomer. It is important to note that here we use the prismatic rectangular sensor geometry so as to maximize the elastomer surface in contact with the flat plate and as such maximize the possible effects of surface friction. We consider a simulation with $\mu$=0.5, and a simulation which is frictionless $\mu$=0.0. As shown in FIG. 7(f), increasing the friction coefficient between the elastomer and the flat plate can lead to variations in the amount of applied force required to reach the $\tilde{P}_{max}$. In this particular case, decreasing friction causes an increase in the required force to reach $\tilde{P}_{max}$. We note that the variation in friction from $\mu$=0.5 to $\mu$=0.0 is significant and that in application variations in friction would be much smaller. This phenomenon is rationalized by looking at the deformation as shown in FIG. 8, which shows contours of vertical displacement at the same force level of F=85 N. When $\mu$>0, the elastomer surface will "stick" to the plate which in turn results in a smaller contact surface between the two. This results in a lower applied force necessary to reach the $\tilde{P}_{max}$, and this is in agreement with previous results when comparing a domed elastomer structure to a rectangular prismatic structure.

Figure 9:
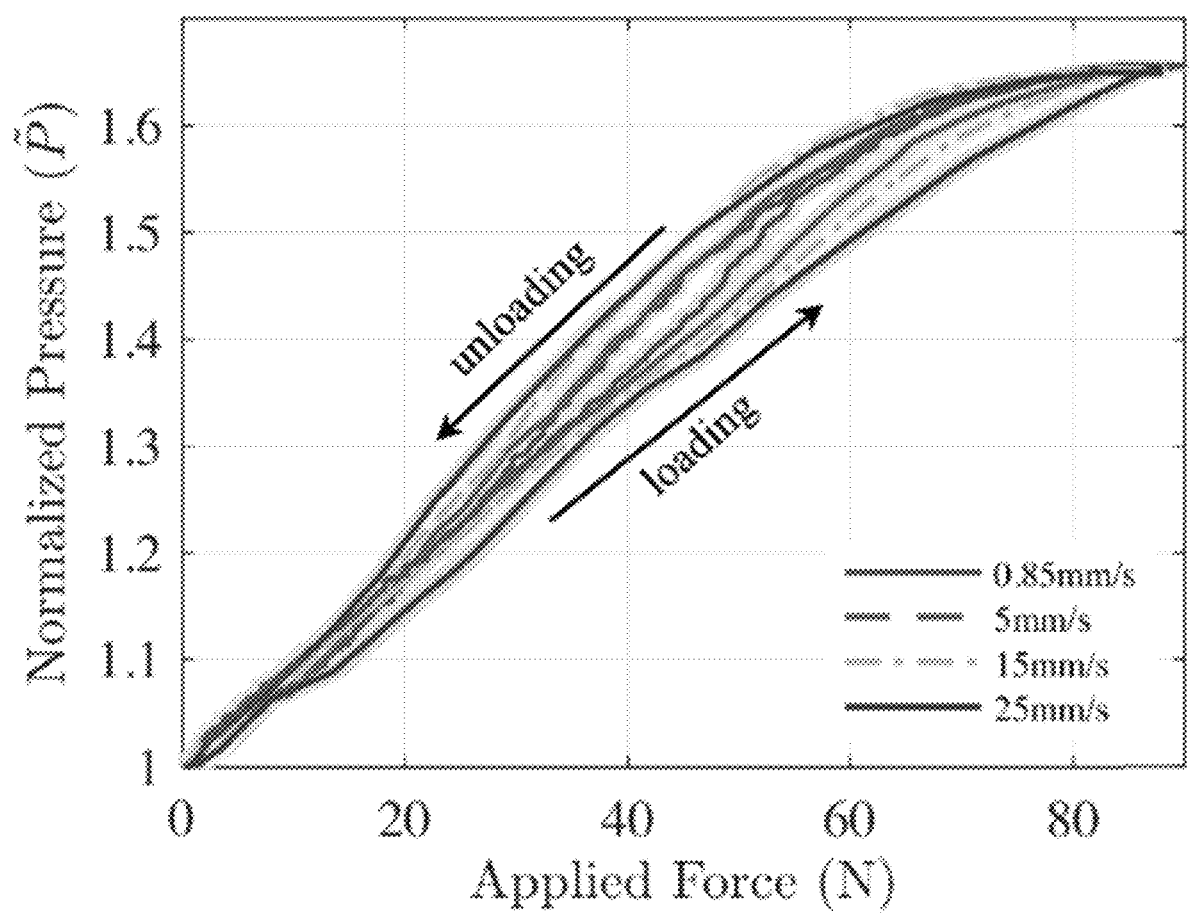
FIG. 9 provides a plot of loading rate dependent response of the pressure sensors and resulting hysteresis behavior, in accordance with an exemplary embodiment of the present invention.

4) Results With Varying Loading Rate, Sensor Hysteresis: Experiments were conducted with varying loading rate to provide a basic experimental understanding of possible loading rate dependence and hysteresis behavior. For these experiments, an Instron E3000 dynamic load frame was used with an inertially compensated load cell. The sensor was loaded at 0.85, 5, 15, and 25 mm/s. FIG. 9 illustrates the hysteresis response of a sensor at these rates. The data presented here are the average response during loading and unloading over five cycles. Note that the sensor used here is of the design summarized below, manufactured with MM20 elastomer and with a bubble volume of 52 mm$^3$. As shown in FIG. 9, the sensor exhibits loading rate dependence and a subsequent hysteresis. This behavior is believed to arise mainly due to the rate-dependent (viscoelastic) behavior of the elastomer itself. During loading, a viscoelastic elastomer has a higher effective stiffness, which in turn leads to the loading path shown in FIG. 9 where we have a higher normalized pressure at a given force. During unloading, the viscoelastic elastomer has a lower effective stiffness which in turn leads to higher normalized pressures at a given applied force.

Summary of Design Parameters and Their Role on Sensor Performance

Figure 10A:
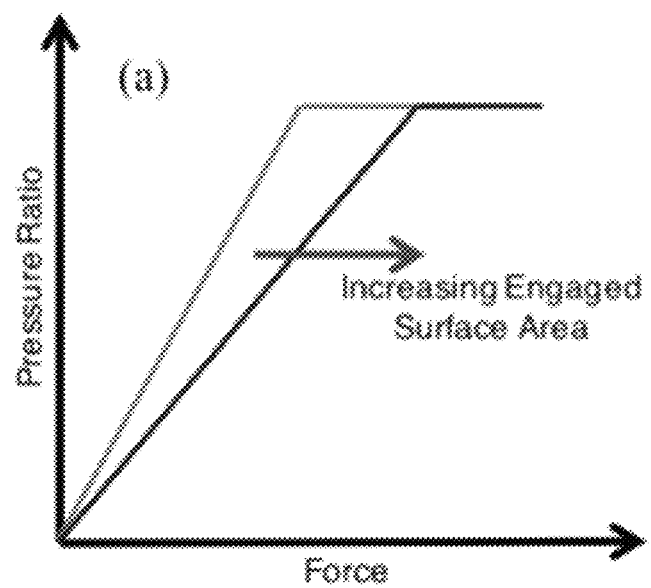
FIG. 10a illustrates the generalized effect of increasing elastomer surface engagement on a sensor's pressure-force curve.
Figure 10B:
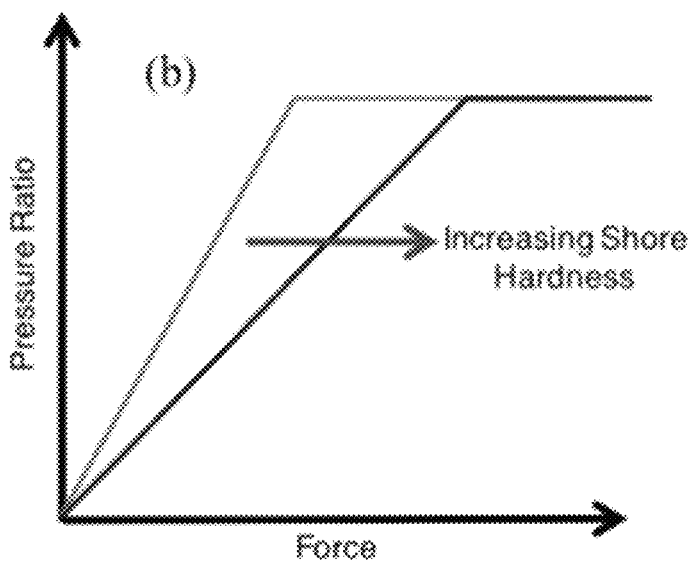
FIG. 10b illustrates generalized effect of increasing shore hardness on a sensor's pressure-force curve.
Figure 10C:
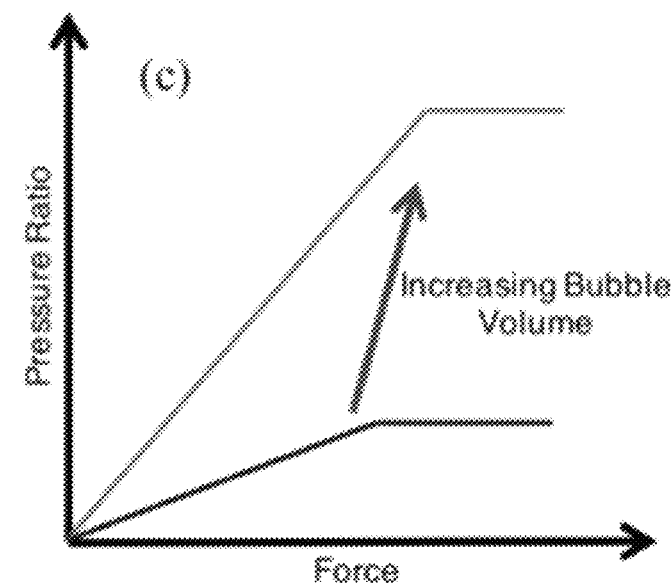
FIG. 10c illustrates the generalized effect of increasing engineered volume on a sensor's pressure-force curve, in accordance with exemplary embodiments of the present invention.

The results of the previous sections may be summarized into three design rules, shown in FIG. 10, for achieving target sensor characteristics. First, as shown in FIG. 10(a), an increase in the amount of elastomer deformed, mainly by increase the area of the elastomer engaged in the deformation process, results in an increase in the applied force required to reach the $\tilde{P}_{max}$. Second, as shown in FIG. 10(b), increasing the stiffness of the elastomer also results in an increase in the applied force required to reach the $\tilde{P}_{max}$. In combination, the effects shown in FIGS. 10(a) and (b) are both related to increasing the overall stiffness of the elastomer structure either through its geometry or its material properties. Finally, as shown in FIG. 10(c), increasing the volume of the engineered cavity within the elastomer results in an increase in $\tilde{P}_{max}$ with little to no change in the applied force required to reach said $\tilde{P}_{max}$. This trend is explained and predicted through ideal gas behavior as described through Equation 2 which allows one to quickly determine the desired air cavity required to achieve a given target maximum pressure sensor. In addition to these design rules, the exemplary force sensor's response is linear until saturation independent of the geometric design, unlike some aforementioned sensors with similar force ranges. Furthermore, the exemplary sensor has a clear, simple path for design from Equation 2 for the engineered volume geometry and the basic finite element model for tunable force sensitivity.

Sensor Design for Given Target Characteristics

The use of the design guidelines and numerical model developed above towards the development of a sensor with target characteristics will now be discussed. This task, along with the applications presented below, serves as a case study on the use of these novel force sensors in robotics, and in particular on RLG for rotorcraft. The primary driver for the requirements is a set of RLG designed for a ≈200 kg unmanned rotorcraft. From the onset we chose to work with the Honeywell MEMS absolute pressure sensors described in above, which can measure a max absolute pressure of 2 atm=202 kPa. Since these force sensors are manufactured at ambient conditions and at sea level, we assume a reference pressure P0≈1 atm=101 kPa. Since the sensors are rated for up to 2 atm, it can be determined that the maximum normalized pressure should be below $\tilde{P}_{max}=2$ so as to avoid damaging the sensors. In order to maximize the sensitivity of the sensors, an engineered cavity volume of $V_{0,e}=65$ mm$^3$ was chosen which yields $\tilde{P}_{max}=1.86$, thus utilizing a large range of the sensors capability without approaching its maximum which could result in damage.

Additionally, the sensor was designed for contact against a flat indenter (plate) located between the sensor and any external forces on the RLG. The sensor design problem was restricted for the RLG case study to a flat indenter because of the operational benefits. Integration of this force sensor with a flat indenter (plate) transforms point, or nonuniform, forces applied to the flat plate into planar forces on the sensor. This in turn improves the predictability of the sensor response as it provides a consistent contact surface.

The RLG system under consideration benefits from repeatable, linear force measurements up to 45 N on each leg for feedback control. This decision was based on roll controllability of the rotorcraft. Based on previous experience with RLG flight test research, foot forces within 2-5% of max takeoff weight induce a rolling moment on the aircraft that is controllable by a pilot or stability augmentation system. Therefore, for a 200 kg rotorcraft, 45 N is well within the safe region of allowable foot forces at 2.2% of max takeoff weight. In order to have a linear response region up 45N, the sensor will need the saturation force to be between 48 and 58 N based trends observed above. Another restriction for this particular application, which was not imposed before, is on the physical size of this sensor. As will be clear in subsequent sections, for this particular system there is a requirement that the sensors overall width does not exceed 18 mm. These two requirements provide guidance for material properties and a form factor limit.

Based on these requirements and the fixed engineered cavity volume described, we iterated on the overall elastomer structure to arrive at the design shown in FIG. 11, where in (a) the results of the FEA simulation used during targeted design are shown, in (b) the numerically predicted is compared to the experimentally measured sensor behavior and in (c) the manufactured sensor is illustrated. Note how in order to fit within the necessary physical space, these sensors have a rectangular base as shown in FIG. 11(c) but a dome-like top and flat surface to yield the desired sensor response. The overall geometry, and the flat section at the top in particular, were designed using the numerical model described earlier to produce the desired $\tilde{P}_{max}$ at an applied load of 56 N. The final material used was the MM10 silicone rubber. The numerical model between varying the material properties and the geometry was iterated to achieve the target performance and ultimately arrived at the design shown here.

FIG. 11(b) shows the finite element prediction and experimental responses of three sensors of this new design. The numerical predictions shown here were performed entirely before sensor manufacturing and testing. No experimental iterations were performed to arrive at this particular sensor design. Each of the sensors achieves the target $\tilde{P}_{max}$ within 3% at an applied force of approximately 56 N. The three example sensor responses shown have an average sensitivity of 0.0156 1/N with R2=0.993. In the next Section, we detail the use of this sensor for various RLG applications including flight testing.

Applications

This Section presents various applications of the exemplary force sensors developed for control of RLG. The results of force feedback control of RLG using a single force sensor, an array of force sensors with the potential for force localization, and finally the use of these force sensors on flight testing of a large scale unmanned rotorcraft with RLG are presented.

Single Sensor Force Feedback Control

A basic application of a single force sensor in a feedback control framework for RLG is presented. Unlike the design shown in FIG. 1, the sensor is shielded with a rubber enclosure which does not bottom out on a structural housing and all load will be carried by the force sensor at all times. FIG. 12(a) shows the single sensor used for this test with FIG. 12(b) showing the sensor mounted on an RLG prototype covered by the elastomer shield. The controller used is designed to minimize the force on each foot until both feet pass a force threshold set by the designer. It is important to note that the force feedback measurement is a direct inversion of the force-pressure sensitivity detailed above.

Figure 13:
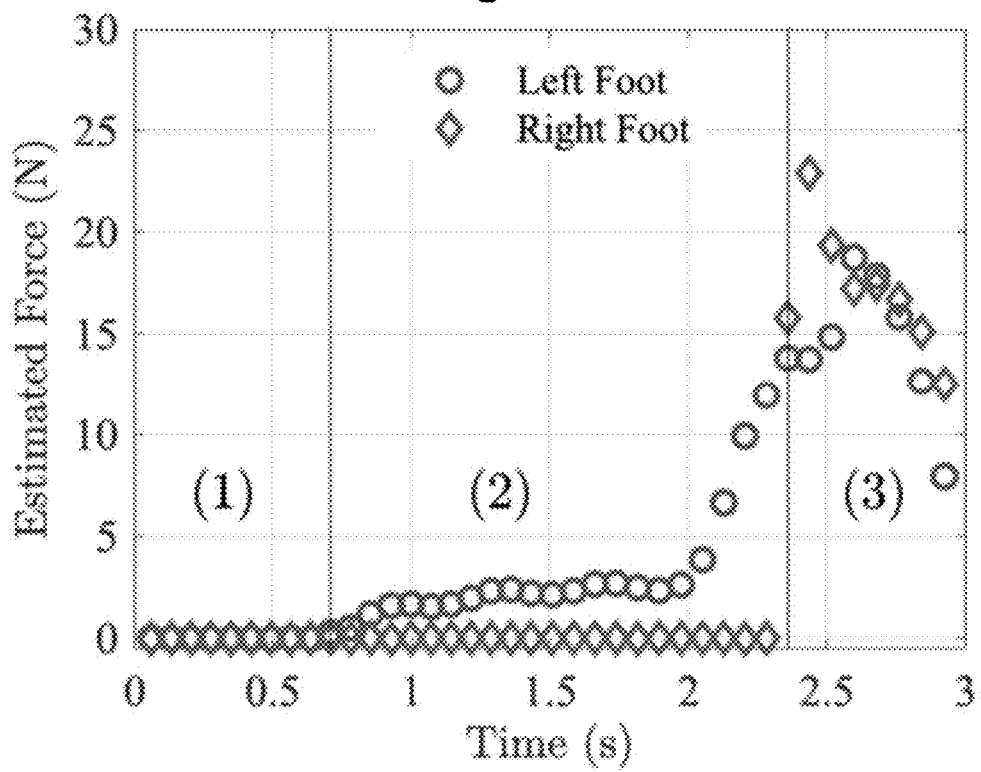
FIG. 13 provides exemplary force feedback measurements through three phases of an experiment on the RLG Prototype, in which Phase (1) is Prior to Initial Contact, Phase (2) is contact on one foot, and Phase (3) is contact on both legs that results in the brake locking, in accordance with an exemplary embodiment of the present invention.

FIGS. 12(c) through (d) show the stages of an experiment where the force feedback provided by the sensors allows the prototype to conform it's legs onto an 8" obstacle. The corresponding real time force measurements on both the left and right feet are shown in FIG. 13. In FIG. 12(c) the frame is lowered by a gantry onto to the floor and the sensors read a nominal load of 0 N, this corresponds to the first phase of the results shown in FIG. 13. Feedback control of the left leg begins as the left foot makes contact and the force increases above a threshold of 1 N, see FIG. 12(b), and continues while only one foot contacts the ground. As shown in FIG. 13, during feedback control the force measurement from our ground force sensor are used to maintain a roughly constant 4 N of contact force on the left leg. Once both legs are in contact, phase three in FIG. 13, the landing gear is locked and both force sensor max out. We note that in phase three of the landing shown in FIG. 13, the gantry was immediately lifted after both legs made contact to prevent sensor damage, hence the reduction in force observed.

As demonstrated above, a single force sensor can be used for fine force feedback control of robotics legs. However, the performance of the system can be significantly improved with the use of multiple sensors in an array. Multiple sensors increase the contact area which can be critical when landing on sloped terrains. Furthermore, multiple sensors add redundancy where the malfunction of a single sensor does not disable the robotic leg. Such a multi-sensor array is discussed next.

Multiple Sensor Force Feedback and Force Localization

The basic design proposed in the previous section can be extended to accommodate multiple sensors in an array. An array with known sensor locations may also be used to determine the point of force contact with respect to the array. FIG. 14(a) shows an exploded CAD model of an experimentally realized force sensor array where three sensors mount onto a single PCB. This design is mounted on a structural housing and subsequently covered with an elastomer shield and an embedded force distribution plate. Following the concept proposed in FIG. 1, this design incorporates a structural housing such that the force plate bottoms out on the structural housing and high loads are not be transferred onto the sensor array. The remainder of this section focuses on the array's calibration via indentation, as shown in FIG. 14(b), and real time estimation of the applied force magnitude and location relative to the sensors.

Figure 15:
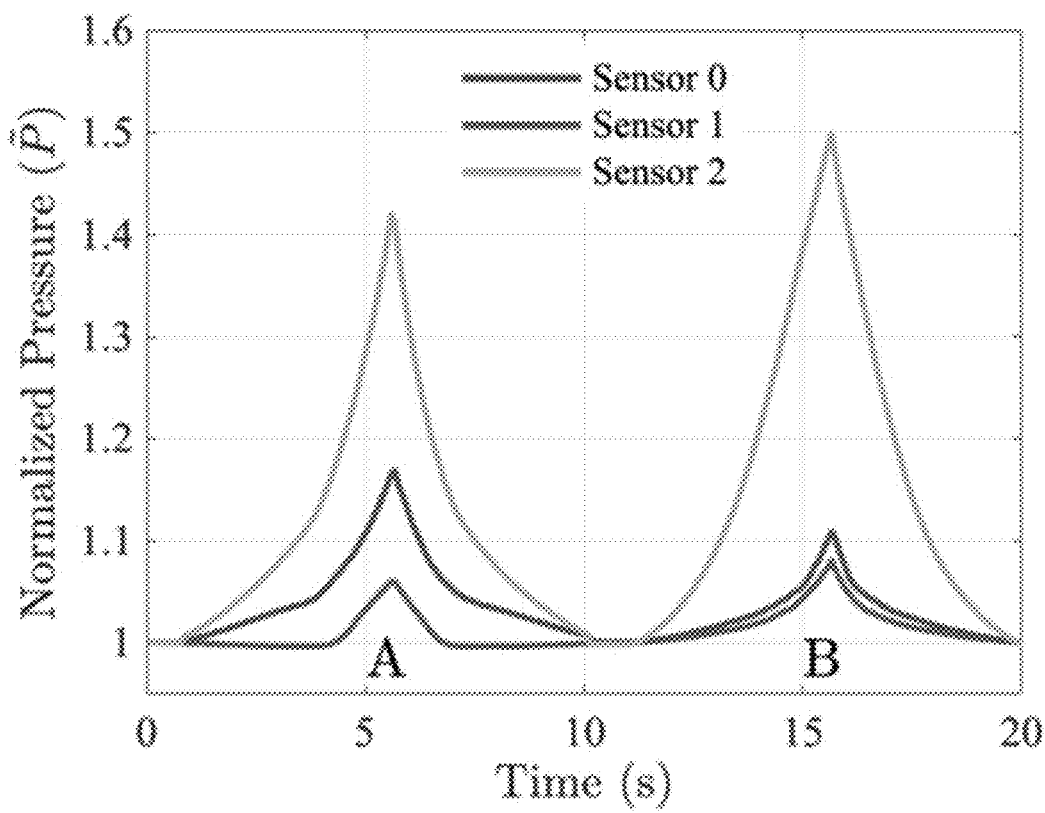
FIG. 15 illustrates normalized pressure vs. force for the three array sensors at two different locations A and B as denoted in FIG. 16, in accordance with an exemplary embodiment of the present invention.
Figure 16:
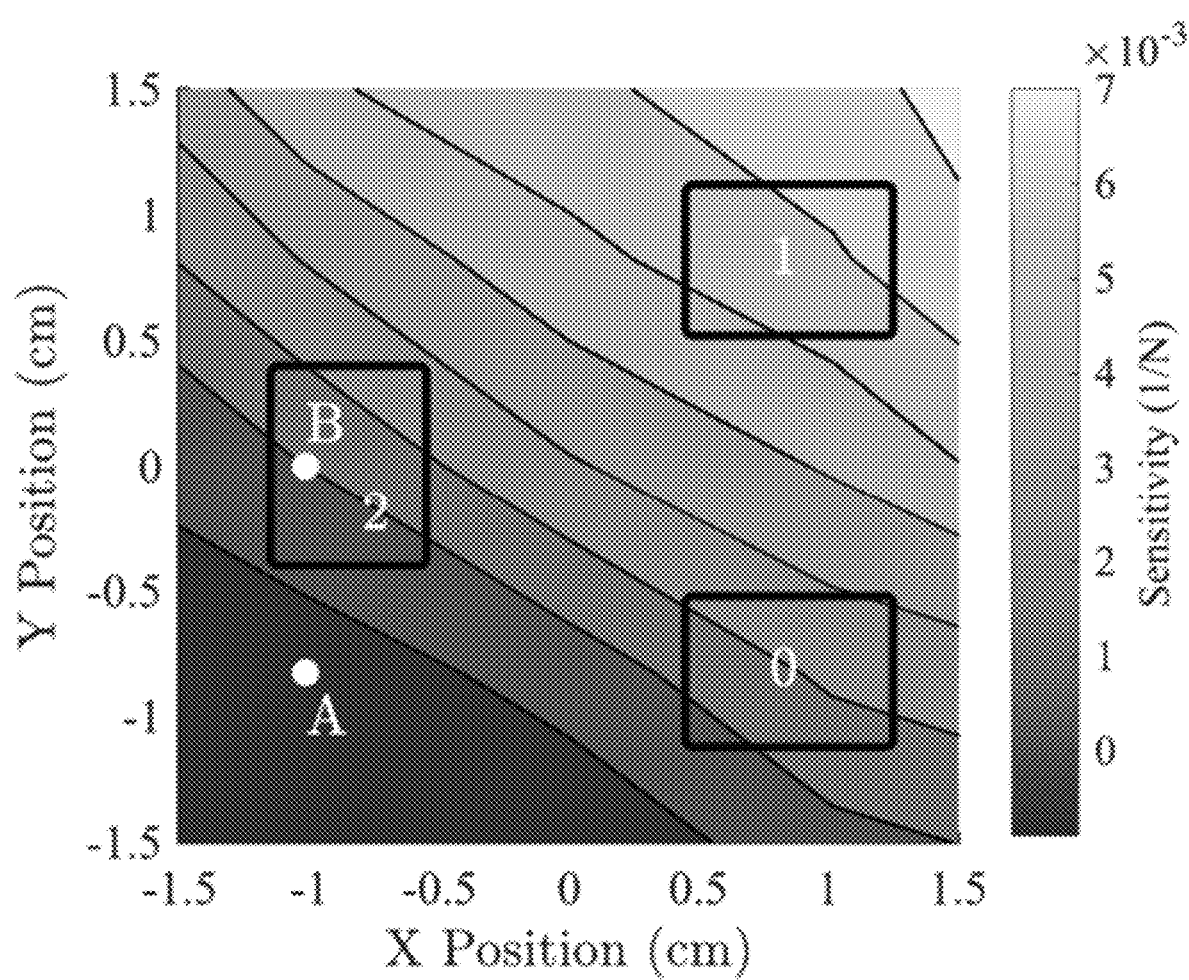
FIG. 16 provides a pressure sensor sensitivity map for Sensor 1, in which the location of all three sensors (Sensor 0, 1, and 2) are highlighted by the Black Rectangles, and in which points A and B denote two specific indentation locations corresponding to the data shown in FIG. 15, in accordance with an exemplary embodiment of the present invention.

The first step to understanding the responsiveness of the system was to calibrate using a known grid of test points around the array of sensors. The same load cell and indenter setup shown in FIG. 3 was used to calibrate the three-sensor array. A grid of 25 points around the sensor array was selected for the calibration process and measured $\tilde{P}$ vs. force on each sensor in the array during indentation at a particular location. As an example, FIG. 15 shows the measured normalized pressure vs time during indentations at the two locations denoted 'A' and 'B' as shown in FIG. 16.

With normalized data vs. force known at each grid point, it is possible to create a pressure-force sensitivity contour of each sensor in the array that is a function of location. This sensor sensitivity contour is shown in FIG. 16 for Sensor 1. For clarity, the physical location of all three Sensors is highlighted. As expected, it was observed that as the location of applied force moves towards a particular sensor, Sensor 1 in this case, that particular sensor becomes more sensitive to the applied force. FIG. 16 also demonstrates that forces applied far from a particular sensor do not produce a significant response for that particular sensor. This behavior shows that the force plate in this design is allowed to unevenly distribute forces by pivoting about the three sensors.

In this design, the force plate applies a small amount of preload to each sensor as such the pressure sensitivity might be negative if the applied load causes a sensor's measured force to decrease. This behavior is visible in FIG. 16, when loads are applied near the bottom left corner, the loads on Sensor 1 decrease as the plate pivots about the other sensors. The calibration data above may be used to determine both the magnitude and application location of a force by training of a least squares estimator (LSE). We define a general second order map of the normalized pressure measured by each sensor, P, to the force applied, F, and the point load equivalent location of the force applied, (x, y). The estimate of these variables is denoted by $(\hat{x}, \hat{y})$ and $\hat{F}$. This general second order mapping is given by $$\begin{Bmatrix} \tilde{P}_{0_k} \\ \tilde{P}_{1_k} \\ \tilde{P}_{2_k} \end{Bmatrix} = \{\tilde{P}_k\} = h(x_k, x_k^2, y_k, y_k^2, F_k) \quad \text{Equation 3}$$

with the state variable estimates, given by $$\{\hat{z}_k\} = \begin{Bmatrix} \hat{x}_k \\ \hat{y}_k \\ \hat{F}_k \end{Bmatrix} \quad \text{Equation 4}$$

A second order map was chosen because of the high correlation between the experimental data and model fit that was not achieved with a first order model. In general, the first order model has a correlation coefficient between 0.91 and 0.96 for the three sensors' experimental data. However, a second order fit matches the data to the model with correlation coefficients of 0.99 or higher for all sensors.

The experimentally measured applied force, pressure ratio, and time data across all 25 grid points was used to compute the second order fit, h( . . . ) in Equation 3, of pressure ratio v. force and location. With a fixed, constant localization mapping, the remainder of the least squares estimate problem was developed. First, it was assumed a starting location, $\hat{z}_0$ and linearize h( . . . ) about that estimate through $$[H_k] = \left[ \frac{d}{d\hat{z}}(h(\hat{z}_k)) \right] \quad \text{Equation 5}$$

With a linearized mapping between the force estimate and measured pressure ratios, a discrete Lyapunov based estimation scheme at each time step was used to update estimates of location and force magnitude. Equations 6 through 8 outline this scheme that uses an optimal correction gain K, and a state estimate covariance matrix P, at each time step in order to minimize estimates error with respect to measurements. The x and y estimate standard deviation values that directly result from the diagonal elements are denoted within the covariance matrix as $\hat{\sigma}_x$ and $\hat{\sigma}_y$, respectively. These values are the estimator's confidence in the obtained solutions. Note that this method requires a starting estimate uncertainty matrix for the position and force estimates, $P_0$. For this implementation, the maximum force expected and the maximum x and y dimensions of the array populate the diagonal elements of this matrix. The rest of the matrix is filled with zeros; no cross correlation of uncertainty.

$$K_k = P_{k-1} H_k^T (H_k P_{k-1} H_k^T + R_k)^{-1} \quad \text{Equation 6}$$

$$\{\hat{z}_k\} = \{\hat{z}_{k-1}\} + K_k (\tilde{P}_k - h(\{\hat{z}_{k-1}\})) \quad \text{Equation 7}$$

$$P_k = (I - K_k H_k) P_{k-1} \quad \text{Equation 9}$$

Figure 17A:
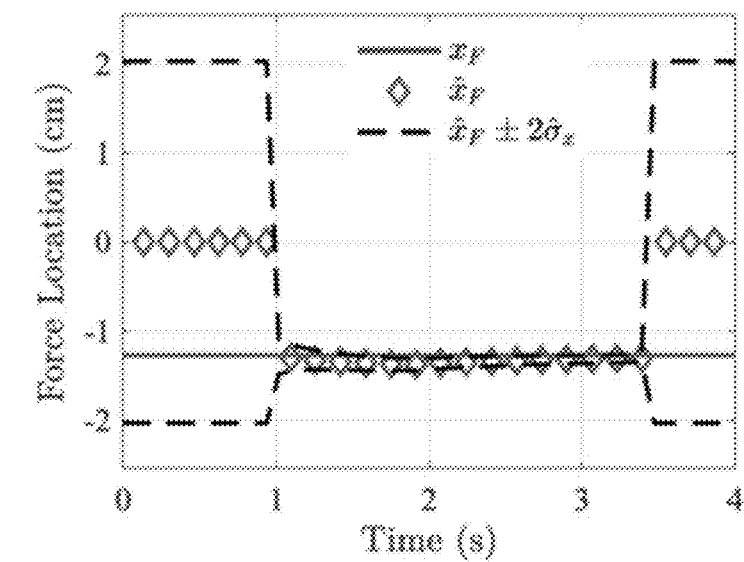
Figure 17B:
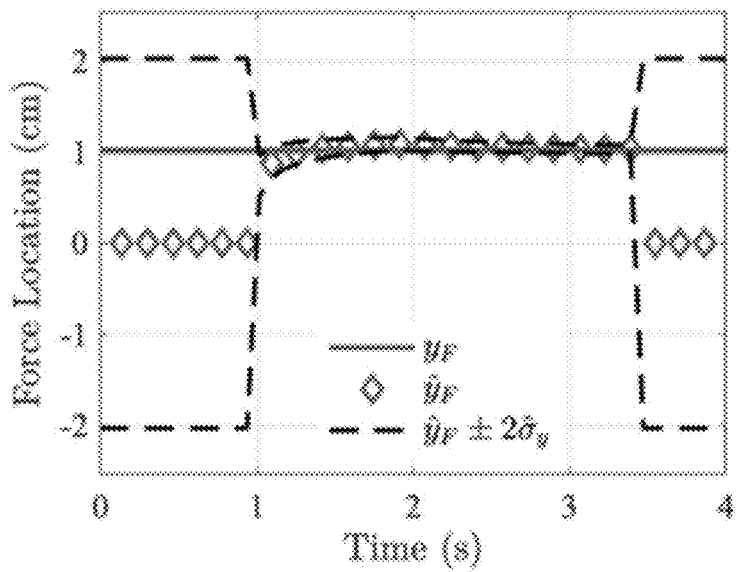
Figure 17C:
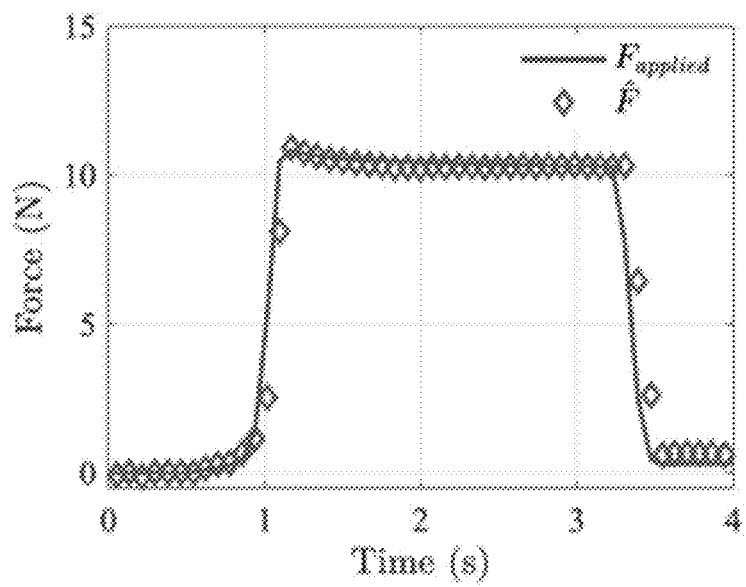

FIG. 17 shows results of the LSE running for the experimental case of a 6.35 mm indenter applying a force at (−0.5, 0.4) relative to the center of the sensor array shown in FIG. 16 at an indentation rate of 0.02 m/s. As these figures show, the least squares estimator is able to converge an estimate of the 2D force location, $(\hat{x}_F, \hat{y}_F)$, and the magnitude of the applied force F, within 5%. The time it takes for the LSE to converge the force and location estimates is also noted. Location estimate take approximately 6 time steps to converge, while the force estimate lags by only one time step behind the applied value. This result successfully demonstrate the ability of a sensor array using the exemplary ground force sensors described herein to be utilized for both force magnitude and force location measurements. The knowledge gained from the previous results were applied to the design, manufacturing, and testing of a full-scale RLG for a ≈200 kg helicopter.

Field Testing on a Full Scale RLG for Rotorcraft

Figure 18B:
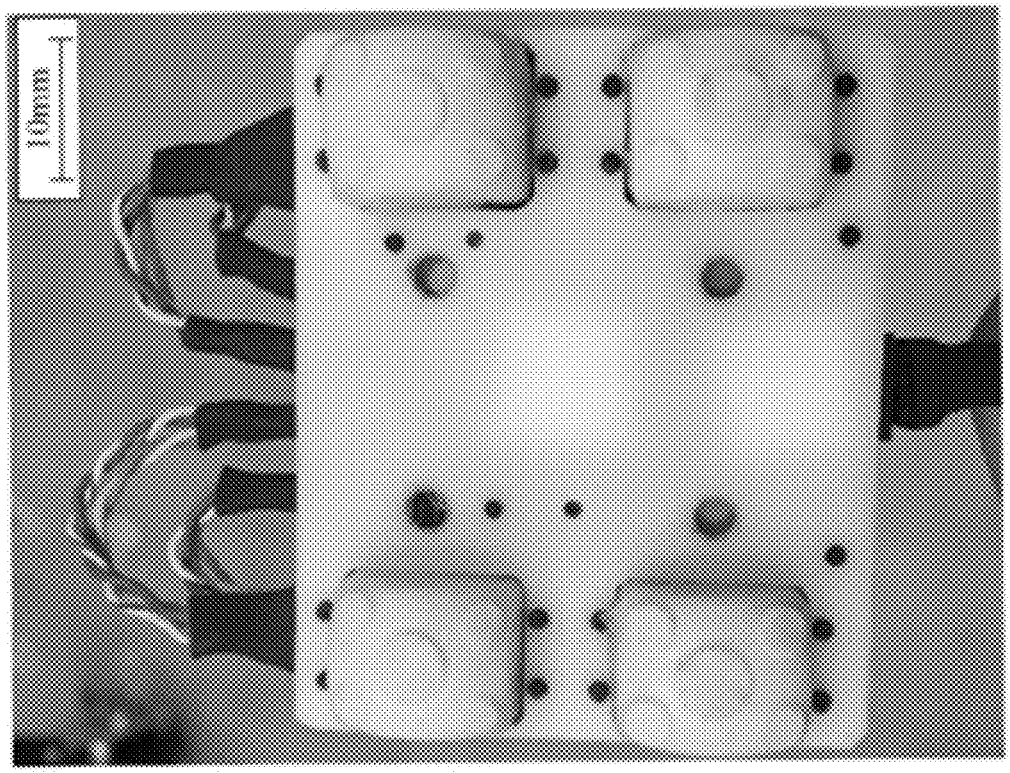
FIGS. 18a-b provides photographs of opposing sides of a four-sensor array with custom electronics board for flight testing of an RLG, in accordance with an exemplary embodiment of the present invention.
Figure 18A:
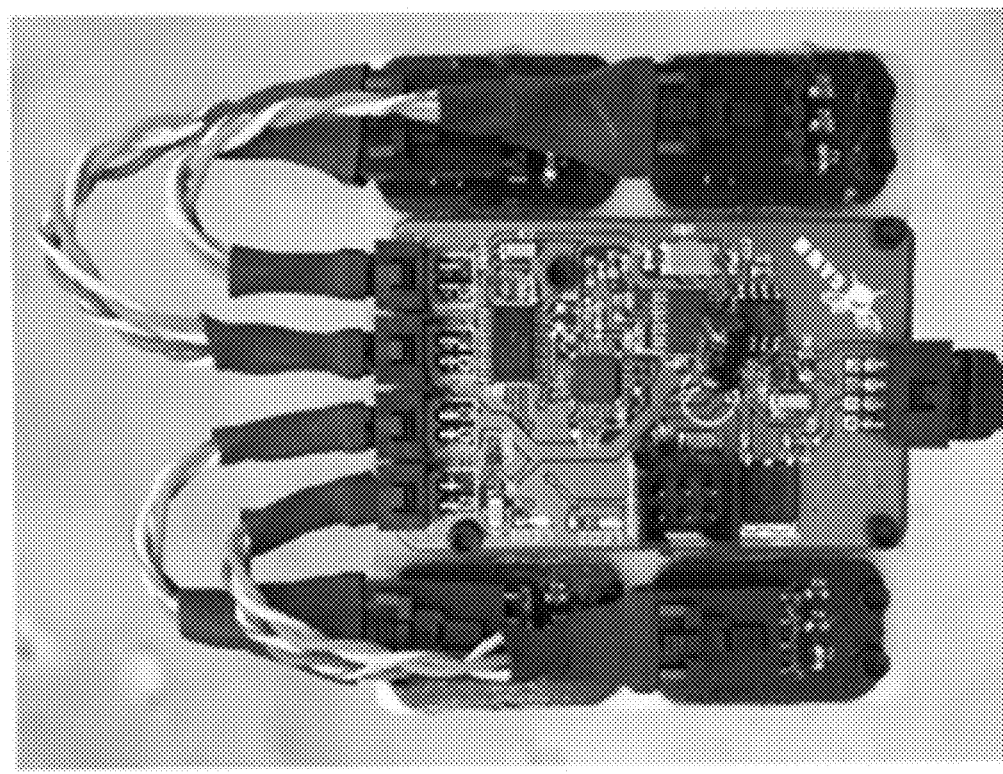

The target driven sensor design described above was used in a four-sensor array in the flight testing of a rotorcraft with RLG. The final four sensor array is shown in FIG. 18. The four-sensor array is designed such that any of the four sensors may be replaced in the field if necessary and provides quad redundancy against sensor failure. Further, the data aggregator board shown is a custom electronics board designed for rapid output of the measured data through a CAN bus which communicates with the avionics core of the RLG system. The CAN bus allows for robust communications over a long range in noisy environments, so it is ideal for the length of communication wire required on a fielded rotorcraft.

Figure 19:
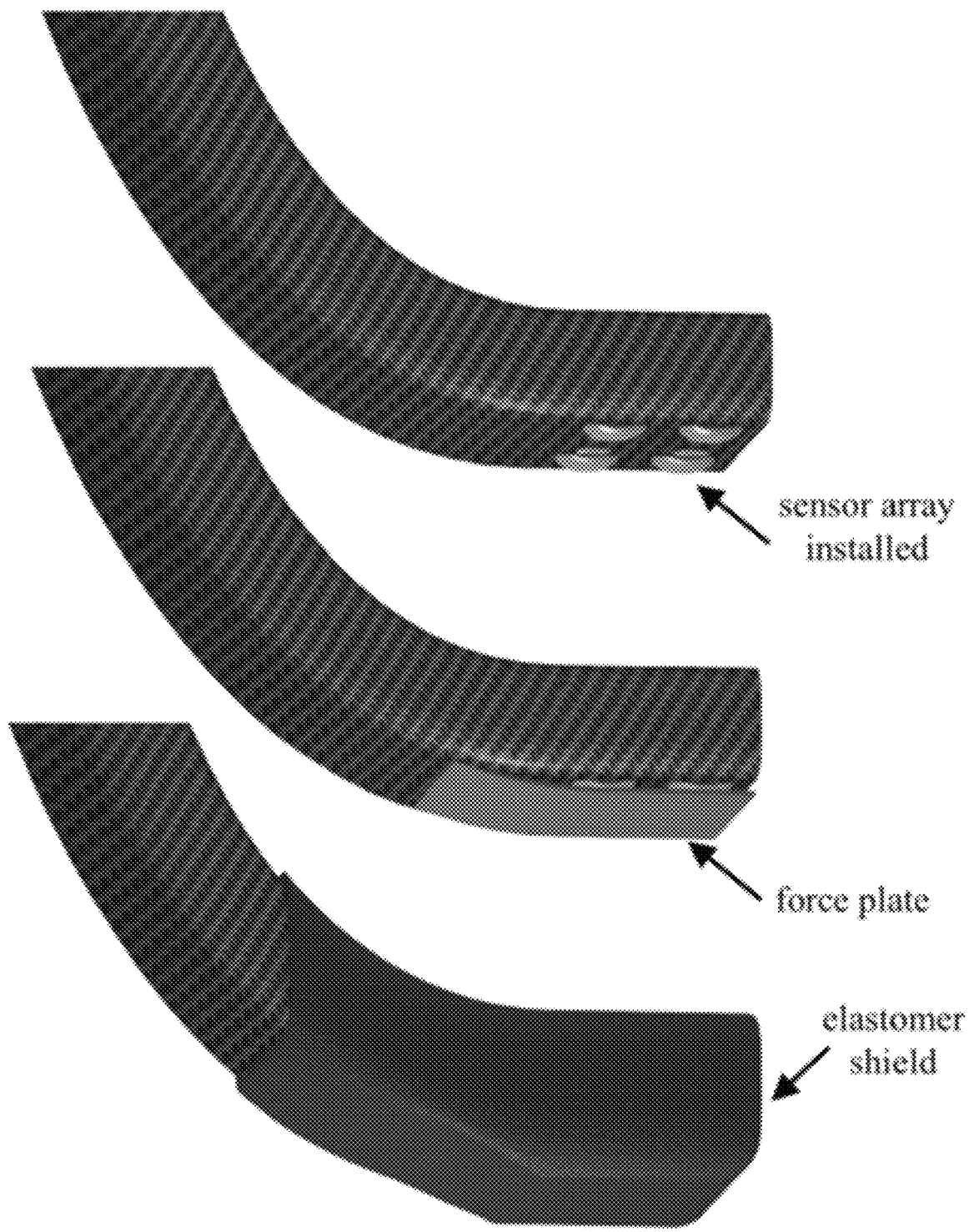
FIG. 19 provide schematics of the four-sensor array stack on the final RLG design in which the sensor array is installed through the front of the leg and can be replaced in the field (not shown) and subsequently covered by a force plate and an elastomer shield, in accordance with an exemplary embodiment of the present invention.

FIG. 19 shows schematically the manner in which the sensor board is assembled onto the RLG foot. Following the concept developed in FIG. 1, this design also incorporates a force plate which bottoms out on a structural housing, that is the robotic landing leg itself. In particular, the force plate in this design is curved to transfer load in multiple planes to a normal force on the sensor and the entire system is enclosed in a protective elastomer-fiberglass composite shield.

Figure 20:
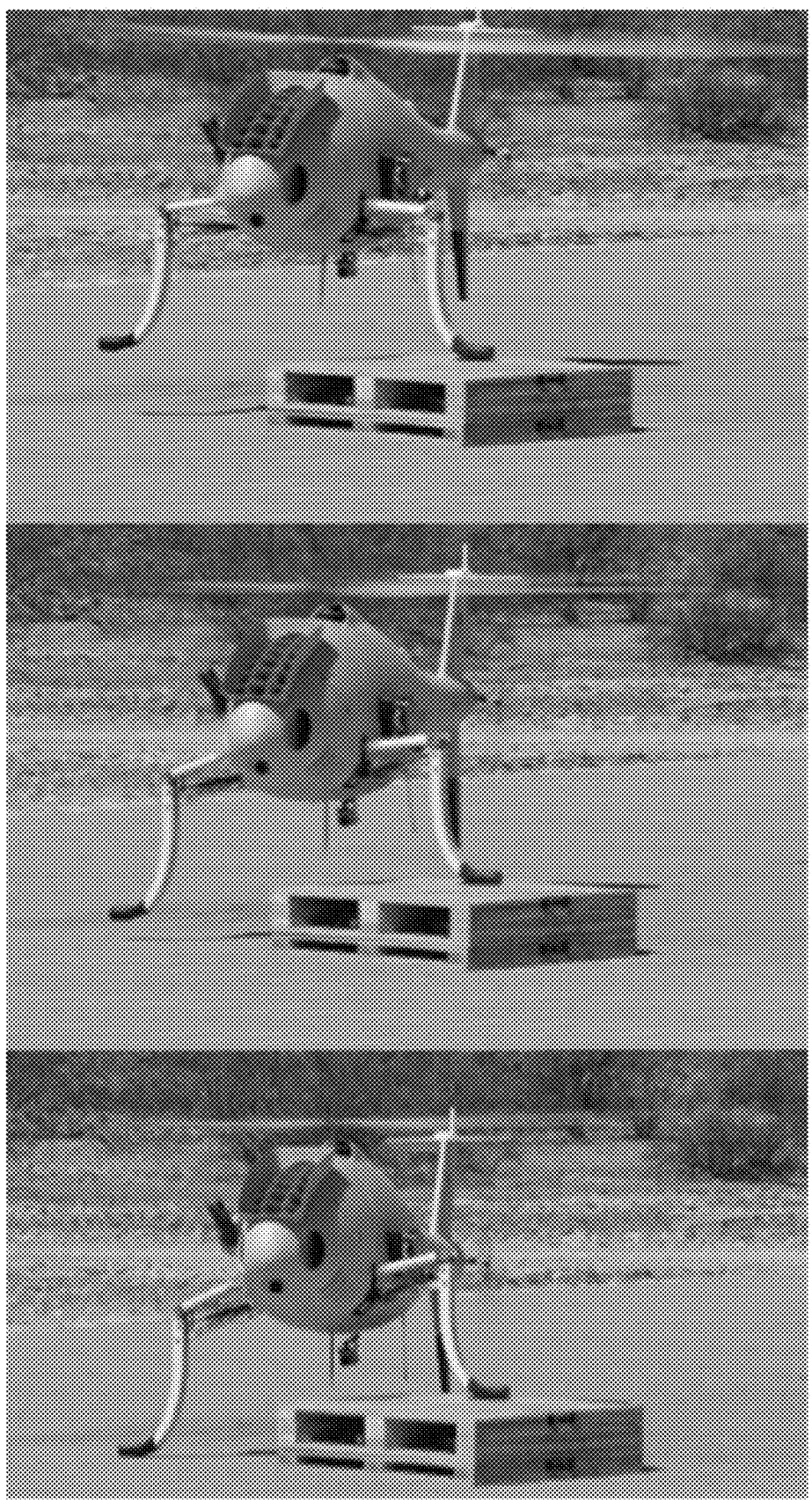
FIG. 20 provide photographs of flight testing of a four-sensor ground contact array used for force feedback of a RLG conforming to a ground obstacle, in accordance with an exemplary embodiment of the present invention.

The force sensors are used in the force feedback control system to enable the safe landing of a full-scale unmanned aerial vehicle weighing ≈200 kg on obstacles up to 30 cm in height or slopes up to 15°. FIG. 20 shows a landing sequence of the unmanned rotorcraft landing on a 22 cm obstacle. Here, the system used only the force sensors presented here for feedback control to conform the legs on the obstacle throughout the landing. Details of the RLG design and control system are beyond the scope of this work and outside the focus which is to detail the novel force sensors developed. The full-scale flight test performed however demonstrates the successful use of the novel force sensors developed for use in robotic leg applications and in particular for RLG.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

What is claimed is:

1. A sensing device comprising:
   a pressure sensor;
   a deformable cover; and
   a deformable cavity situated between the deformable cover from the pressure sensor;
   wherein the deformable cavity contains a fluid, such that when an external force is applied to a surface of the deformable cover, the deformable cavity deforms, the fluid maintains a physical separation of the deformable cover from the pressure sensor, and the external force alters a volume of the deformable cavity that, via the fluid, alters a pressure sensed by the pressure sensor.

2. The sensing device of claim 1 further comprising a sensor housing comprising a sensor cavity disposed within the sensor housing, the pressure sensor disposed within the sensor cavity;
   wherein the deformable cover is disposed adjacent to the sensor housing;
   wherein the deformable cavity is in fluid communication with the sensor cavity;
   wherein the sensor cavity contains the fluid;
   wherein the sensor cavity comprises a first end and a second end;
   wherein the pressure sensor is positioned proximate the first end of the sensor cavity; and
   wherein the deformable cavity is positioned proximate the second end of the sensor cavity.

3. The sensing device of claim 1, wherein the sensor cavity is non-deformable.

4. The sensing device of claim 1, wherein the deformable cover comprises a polymer.

5. The sensing device of claim 4, wherein the polymer is an elastomer.

6. The sensing device of claim 1, wherein the pressure sensor is a MEMs barometric pressure sensor.

7. The sensing device of claim 1, wherein the deformable cover covers an outer surface of the sensor housing.

8. The sensing device of claim 1, wherein the deformable cover is semi-spherically-shaped.

9. The sensing device of claim 1, wherein the sensing device is configured to detect forces applied to a surface of the deformable cover as low as 1 millinewton.

10. The sensing device of claim 1 further comprising a housing comprising an aperture;
    wherein the pressure sensor is disposed within an interior of the housing; and
    wherein at least a portion of the deformable cover extends through the aperture to an exterior of the housing.

11. The sensing device of claim 1, wherein the sensing device is configured to:
    detect forces applied to a surface of the deformable cover as low as 1 millinewton; and
    withstand a force applied to a surface of the deformable cover of 10 kilonewtons without damaging the sensor device.

12. The sensing device of claim 1, wherein the fluid is compressible.

13. A sensing device comprising:
    a MEMS sensor comprising an intrinsic sensor cavity;
    a deformable cover comprising an elastomeric membrane with an engineered air cavity;
    wherein the engineered air cavity is positioned to maintain a physical distance between the MEMS sensor and the elastomeric membrane of the deformable cover;
    wherein the sensing device is configured such that a force applied to an outer surface of the deformable cover causes a volume of the engineered air cavity to change, altering a pressure sensed by the MEMS sensor.

14. The sensing device of claim 13, wherein the sensing device is configured to detect forces applied to a surface of the deformable cover as low as 1 millinewton.

15. The sensing device of claim 13, wherein the sensing device is capable of withstanding a force applied to a surface of the deformable cover of 10 kilonewtons without damaging the sensor device.

* * * * *